(12) United States Patent
Rioux et al.

(10) Patent No.: US 7,315,779 B1
(45) Date of Patent: Jan. 1, 2008

(54) VEHICLE SPEED LIMITER

(75) Inventors: Roger Rioux, Magog (CA); Dominic Dagenais, Canton de Shefford (CA); Marc Gagnon, Austin (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 11/627,780

(22) Filed: Jan. 26, 2007

Related U.S. Application Data

(60) Provisional application No. 60/871,684, filed on Dec. 22, 2006.

(51) Int. Cl.
*G06F 19/00* (2006.01)
*F02D 1/08* (2006.01)

(52) U.S. Cl. .................. 701/114; 701/110; 123/352; 123/399

(58) Field of Classification Search ........... 701/114, 701/110, 115, 102, 51, 200; 123/350, 352, 123/361, 399
See application file for complete search history.

(56) References Cited

U.S. PATENT DOCUMENTS

| | | | | |
|---|---|---|---|---|
| 4,453,517 | A | * | 6/1984 | Kasiewicz .................. 123/352 |
| 4,662,247 | A | * | 5/1987 | Sotoyama et al. ............ 701/51 |
| 4,810,216 | A | | 3/1989 | Kawamura |
| 4,879,657 | A | * | 11/1989 | Tamura et al. ............... 701/110 |
| 5,016,589 | A | * | 5/1991 | Terazawa .................... 123/399 |
| 5,036,802 | A | | 8/1991 | D'Amours |
| 5,222,901 | A | | 6/1993 | Burkenpas |
| 5,350,328 | A | | 9/1994 | Yagi |
| 5,700,171 | A | | 12/1997 | Horton |
| 5,794,574 | A | | 8/1998 | Bostelmann et al. |
| 6,405,669 | B2 | | 6/2002 | Rheault et al. |
| 6,485,341 | B1 | | 11/2002 | Lanyi et al. |
| 6,551,153 | B1 | | 4/2003 | Hattori |
| 6,691,680 | B2 | | 2/2004 | Saito |

(Continued)

FOREIGN PATENT DOCUMENTS

EP    1688604 A1    8/2006

(Continued)

OTHER PUBLICATIONS

U.S. Appl. No. 11/627,787, filed Jan. 26, 2007.

(Continued)

*Primary Examiner*—Hieu T. Vo
(74) *Attorney, Agent, or Firm*—Osler, Hoskin & Harcourt LLP

(57) ABSTRACT

A vehicle has a straddle seat, a handlebar, an engine, an electronic control unit (ECU), a throttle valve, a throttle valve actuator, and a throttle operator. A throttle operator position sensor senses a throttle operator position. A vehicle speed sensor senses a vehicle speed. The ECU sends a control signal to the throttle valve actuator based on the throttle operator position and the vehicle speed. The throttle valve actuator adjusts the opening of the throttle valve in response to the control signal. If the vehicle speed is lower than a predetermined maximum vehicle speed, the throttle valve actuator adjusts the opening of the throttle valve based on the throttle operator position signal. If the vehicle speed is higher than the predetermined maximum vehicle speed, the throttle valve actuator reduces the degree of opening of the throttle valve. A method of controlling an engine is also disclosed.

28 Claims, 13 Drawing Sheets

U.S. PATENT DOCUMENTS

| | | |
|---|---|---|
| 6,695,657 B2 | 2/2004 | Hattori |
| 6,699,085 B2 | 3/2004 | Hattori |
| 6,709,302 B2 | 3/2004 | Yanagihara |
| 6,733,350 B2 | 5/2004 | Iida et al. |
| 6,757,606 B1 | 6/2004 | Gonring |
| 6,772,061 B1 | 8/2004 | Berthiaume et al. |
| 6,855,020 B2 | 2/2005 | Kaji |
| 6,886,529 B2 | 5/2005 | Suzuki et al. |
| 6,889,654 B2 | 5/2005 | Ito |
| 6,895,286 B2 | 5/2005 | Kaji et al. |
| 6,948,990 B2 | 9/2005 | Hattori |
| 6,964,260 B2 | 11/2005 | Samoto et al. |
| 7,021,283 B2 | 4/2006 | Okuyama |
| 7,036,446 B2 | 5/2006 | Jhons |
| 7,124,852 B2 | 10/2006 | Hasegawa |
| 7,163,000 B2 | 1/2007 | Ishida et al. |
| 7,185,630 B2 | 3/2007 | Takahashi et al. |
| 7,229,330 B2 | 6/2007 | Walser et al. |
| 2005/0143875 A1 | 6/2005 | Gai |
| 2005/0263132 A1 | 12/2005 | Tsuide |
| 2006/0243246 A1 | 11/2006 | Yokoi |
| 2006/0243247 A1 | 11/2006 | Yokoi |
| 2006/0247840 A1 | 11/2006 | Matsuda et al. |
| 2007/0050125 A1 | 3/2007 | Matsuda et al. |

FOREIGN PATENT DOCUMENTS

| | | |
|---|---|---|
| EP | 1691059 A1 | 8/2006 |
| EP | 1719891 A2 | 11/2006 |
| EP | 1722085 A1 | 11/2006 |
| EP | 1760298 A2 | 3/2007 |
| EP | 1760301 A2 | 3/2007 |
| JP | 2001260986 A2 | 9/2001 |
| WO | WO2005/047671 A1 | 5/2005 |
| WO | WO2005/054647 A1 | 6/2005 |

OTHER PUBLICATIONS

U.S. Appl. No. 11/627,797, filed Jan. 26, 2007.

Japanese patent Abstract of 2001260986A2, Published on Sep. 26, 2001.

Mercury Announces New SmartTow System, Fond du Lac, Wis. (Aug. 23, 2006).

* cited by examiner

VEHICLE SPEED LIMITER

CROSS-REFERENCE

The present application claims priority to U.S. Provisional Patent Application No. 60/871,684, filed Dec. 22, 2006, entitled "Throttle-By-Wire System", the entirety of which is enclosed herewith.

FIELD OF THE INVENTION

The present invention relates to an engine control method and a vehicle having an engine controlled by the method.

BACKGROUND OF THE INVENTION

Most recreational vehicles, such as all-terrain vehicles (ATVs), snowmobiles, and personal watercraft, are powered by an internal combustion engine. The operation of the engine generally is controlled by adjusting the quantity of air and fuel the combustion chambers of the engine receive, and by controlling the timing of the ignition of the air/fuel mixture in the combustion chamber. In the case of fuel injected engines, the timing of the injection of the fuel can also be controlled.

Recreational vehicles typically have one or more throttle valves in the engine's air intake system which are mechanically connected to a driver operated throttle operator, generally by a control cable. The throttle operator, generally in the form of a lever or a twist grip on a handlebar of the vehicle, is used by the driver to open and close the throttle valves to adjust the quantity of air going to the combustion chambers of the engine. An electronic control unit (ECU) located in the vehicle then controls the engine's ignition system, and in the case of fuel injected engine, the engine's fuel injection system, accordingly. In order to have the engine generate more power, the driver would use the throttle operator to cause the throttle valve to open further. Similarly, in order to have the engine generate less power, the driver would use the throttle operator to cause the throttle valve to close. For example, in the case of an ATV moving on a level surface, opening the throttle valve results in the ATV accelerating and closing the throttle valve results in the ATV decelerating.

In some instances, it is desirable to limit the power generated by the engine, to limit the maximum speed of the engine or to have a cruise control function on the vehicle for example. Since in the above-described vehicles the degree of opening of the throttle valve is controlled by the driver of the vehicle, this leaves the ECU to control the ignition and, where available the injection, in order to limit the power of the engine. For example, when the engine reaches a predetermined maximum speed, the ECU will control the engine such that some of the spark plugs are not fired and/or that fuel is not injected in every combustion chamber. This control strategy results however in a rough engine operation which is undesirable.

Recent developments in the field of automotive electronics now allow these vehicles to be equipped with what is known as a throttle-by-wire system. In such vehicles, a throttle operator position sensor senses the position of the throttle operator, transmits this position to the ECU, and the ECU sends a signal to a throttle valve actuator, an electric actuator for example, to adjust the degree of opening of the throttle valve based on the position of the throttle operator. This way, the degree of opening of the throttle valve is also a variable, in addition to the ignition and fuel injection, that can be adjusted by the ECU. Vehicles using such systems can therefore use the degree of opening of the throttle valve to limit the speed of the engine. When a predetermined maximum engine speed is reached or exceeded, the ECU will not cause the throttle valve to be opened further or will cause the degree of opening of the throttle valve to be reduced notwithstanding the fact that the signal from the operator position sensor communicated to the ECU indicates a desire by the driver to increase the speed of the engine.

This greatly improves the control of the engine, however controlling the engine based on the engine speed may not be ideal in some instances. For example, regulations prevent personal watercraft manufacturers from making personal watercraft that can exceed 105 km/h (65 MPH). For the same engine speed, the personal watercraft will go at a different speed depending on the load on the vehicle (i.e. weight of the driver, passengers, and items carried on board). Therefore, the predetermined maximum engine speed must be selected such that the personal watercraft will not exceed 100 km/h no matter how light the load on it is. This causes a reduced performance of the personal watercraft when the load is increased (driver with passengers for example) since it will have a lower maximum speed than when a lighter load is present (only the driver for example). Similar instances also exist for land vehicles.

Therefore, there is a need for a method which ameliorates the control of the engine of the vehicle to control the performance of a vehicle.

Throttle-by-wire systems also simplify the implementation of cruise control systems on vehicles. In automotive applications the cruise control is typically engaged by pressing a button on the steering wheel of the vehicle and can be disengaged by pressing the button again or by pressing the brake. However, this method may not be applicable to every type of vehicle, such as personal watercraft given their lack of brakes.

Therefore there is a need for a novel cruise control engine operation mode.

It is generally preferred that the performance of a vehicle be more restricted when it is operated in the reverse direction than when it is going forward. This can be achieved by using a mechanical transmission that reduces the speed of rotation from the engine to the wheels of the vehicle, for example, along with the direction of rotation when the reverse position of the transmission is selected. However, such transmissions can be complex and add substantial weight to the vehicle, especially for vehicles using a continuously variable transmission (CVT).

Therefore there is a need for a method to ameliorate the control of the performance of a vehicle operated in a reverse direction.

SUMMARY OF THE INVENTION

It is an object of the present invention to ameliorate at least some of the inconveniences present in the prior art.

It is an object of the present invention to provide a vehicle that has an ECU that controls an engine of the vehicle by sending a control signal to a throttle valve actuator such that the vehicle does not exceed a predetermined maximum vehicle speed.

It is a further object of the present invention to provide a method of controlling an engine of a vehicle by adjusting a degree of opening of a throttle valve such that the vehicle does not exceed a predetermined maximum vehicle speed.

In one aspect, the invention provides a vehicle having a vehicle body and a straddle seat for a driver. The seat is associated with the vehicle body. A handlebar for steering the vehicle is disposed forwardly of the straddle seat. An engine is associated with the vehicle body for powering the vehicle. The engine has at least one combustion chamber. An electronic control unit (ECU) on the vehicle controls an operation of the engine. A throttle body is in fluid communication with the at least one combustion chamber. A throttle valve is disposed in the throttle body for controlling an amount of air supplied to the at least one combustion chamber. A throttle valve actuator is operatively connected to the throttle valve and is in electronic communication with the ECU. A throttle operator is mounted on the handlebar. A throttle operator position sensor senses a throttle operator position and is in electronic communication with the ECU for sending a signal representative of a throttle operator position to the ECU. A vehicle speed sensor senses a vehicle speed and is in electronic communication with the ECU for sending a signal representative of a vehicle speed to the ECU. The ECU sends a control signal to the throttle valve actuator based on the throttle operator position signal and the vehicle speed signal. The throttle valve actuator adjusts a degree of opening of the throttle valve in response to the control signal. If the vehicle speed is lower than a predetermined maximum vehicle speed, the control signal causes the throttle valve actuator to adjust the degree of opening of the throttle valve based on the throttle operator position signal. If the vehicle speed is higher than the predetermined maximum vehicle speed, the control signal causes the throttle valve actuator to reduce the degree of opening of the throttle valve.

In an additional aspect, if the vehicle speed is higher than the predetermined maximum vehicle speed, the control signal causes the throttle valve actuator to reduce the degree of opening of the throttle valve notwithstanding a fact that the signal representative of the throttle operator position communicated to the ECU indicates a desire by the driver to increase the speed of the vehicle.

In a further aspect, if the vehicle speed is equal to the predetermined maximum vehicle speed, the degree of opening of the throttle valve is not increased notwithstanding a fact that the signal representative of the throttle operator position communicated to the ECU indicates a desire by the driver to increase the speed of the vehicle.

In an additional aspect, the throttle operator is selected from a group consisting of a thumb-actuated throttle lever, a finger-actuated throttle lever, and a twist grip.

In a further aspect, the vehicle also has a jet propulsion unit operatively connected to the engine. The vehicle body has a hull and a deck disposed on the hull. The engine is disposed between the hull and the deck.

In an additional aspect, the vehicle speed sensor is selected from a group consisting of a paddle wheel, a GPS unit, and a pitot tube.

In a further aspect, the vehicle also has only three wheels associated with the vehicle body.

In an additional aspect, the vehicle also has at least one of at least four wheels associated with the vehicle body and an endless track associated with the vehicle body.

In a further aspect, the vehicle speed sensor includes a GPS unit.

In an additional aspect, the vehicle speed sensor senses a rotational speed of a shaft of the vehicle.

In a further aspect, the vehicle also has a fuel injection system for injecting fluid in the at least one combustion chamber, an ignition system for igniting a mixture of fuel and air in the at least one combustion chamber, and a throttle valve position sensor for sensing the degree of opening of the throttle valve and in electronic communication with the ECU for sending a signal representative of a throttle valve position to the ECU. The ECU controls at least one of the fuel injection system and the ignition system based on the throttle valve position signal.

In an additional aspect, the vehicle also has a throttle valve position sensor for sensing the degree of opening of the throttle valve and in electronic communication with the ECU for sending a signal representative of a throttle valve position to the ECU. The ECU establishes a desired degree of opening of the throttle valve based on the throttle operator position signal. The ECU generates the control signal both by: (a) comparing the desired degree of opening of the throttle valve to the degree of opening of the throttle valve, and (b) comparing the vehicle speed to the predetermined maximum vehicle speed.

In a further aspect, when a variation in the vehicle speed signal occurs which is greater than a predetermined acceptable variation, the ECU ignores the variation in the vehicle speed signal for a predetermined time delay.

In an additional aspect, when a failure of the vehicle speed sensor is detected, the ECU limits the operation of the engine to one of a default maximum engine speed and a default maximum engine torque. The one of the default maximum engine speed and the default maximum engine torque is selected such that when the engine operates at the one of the default maximum engine speed and the default maximum engine torque, the vehicle speed is less than the predetermined maximum vehicle speed.

In a further aspect, the vehicle also has a key receiver disposed on the vehicle body for receiving one of at least two keys that can be used to permit operation of the vehicle. The key receiver is in electronic communication with the ECU. The predetermined maximum vehicle speed is determined from information contained on the one of the at least two keys which is received in the key receiver. The predetermined maximum vehicle speed is different for each of the at least two keys.

In an additional aspect, the predetermined maximum vehicle speed is permanently stored in the ECU.

In a further aspect, when a variation in the vehicle speed signal occurs which is greater than a predetermined maximum acceptable variation, the ECU controls the engine such that a speed of rotation of the engine is reduced.

In another aspect, the invention provides a method of controlling an engine of a vehicle. The engine has at least one combustion chamber. The vehicle has a throttle operator, a throttle body in fluid communication with the at least one combustion chamber, a throttle valve disposed in the throttle body for controlling an amount of air supplied to the at least one combustion chamber, and a throttle valve actuator operatively connected to the throttle valve for adjusting a degree of opening of the throttle valve. The method comprises sensing a throttle operator position, sensing a vehicle speed, and comparing the vehicle speed to a predetermined maximum vehicle speed. If the vehicle speed is lower than the predetermined maximum vehicle speed, the degree of opening of the throttle valve is adjusted based on the throttle operator position. If the vehicle speed is higher than the predetermined maximum vehicle speed, the degree of opening of the throttle valve is reduced until the vehicle speed is at the predetermined maximum speed.

In a further aspect, if vehicle speed is greater than the predetermined maximum vehicle speed, a driver instruction to increase the degree of opening of the throttle valve is not implemented.

In an additional aspect, if vehicle speed is equal to the predetermined maximum vehicle speed, a driver instruction to increase the degree of opening of the throttle valve is not implemented.

In a further aspect, the step of sensing the vehicle speed includes sensing one of a rotational speed of a paddle wheel mounted to the vehicle, a rotational speed of a shaft of the vehicle, and a pressure of a fluid in which the vehicle is used.

In an additional aspect, the step of sensing the vehicle speed includes determining a change in position of the vehicle over a period of time based on information obtained from a GPS unit.

In a further aspect, the method also comprises sensing the degree of opening of the throttle valve, and controlling at least one of a fuel injection system and an ignition system based on the degree of opening of the throttle valve.

In an additional aspect, the method also comprises sensing the degree of opening of the throttle valve. The step of adjusting the degree of opening of the throttle valve includes establishing a desired degree of opening of the throttle valve based on the throttle operator position. If the desired degree of opening of the throttle valve is less than the degree of opening of the throttle valve, the degree of opening of the throttle valve is decreased until the degree of opening of the throttle valve is equal to the desired degree of opening of the throttle valve. If the desired degree of opening of the throttle valve is greater than the degree of opening of the throttle valve, the degree opening of the throttle valve is increased until one of a first condition and a second condition is met. The first condition is that the degree of opening of the throttle valve is equal to the desired degree of opening of the throttle valve. The second condition is that the vehicle speed is equal to the predetermined maximum vehicle speed.

In a further aspect, the method also comprises ignoring a variation in the vehicle speed which is greater than a predetermined maximum acceptable variation for a predetermined time delay when sensing the vehicle speed, and using the vehicle speed prior to the variation in the vehicle speed when comparing the vehicle speed to the predetermined maximum vehicle speed during the predetermined time delay.

In an additional aspect, the method also comprises sensing for failure of a vehicle speed sensor, and limiting the engine to one of a default maximum engine speed and a default maximum engine torque when failure of the vehicle speed sensor is sensed. The one of the default maximum engine speed and the default maximum engine torque is selected such that when the engine is at the one of the default maximum engine speed and the default maximum engine torque, the vehicle speed is lower than the predetermined maximum vehicle speed.

In a further aspect, the method also comprises obtaining information contained on a key inserted in a key receiver of the vehicle, and using the information contained on the key to determine the predetermined maximum vehicle speed.

In an additional aspect, the method also comprises reducing a speed of rotation of the engine when a variation in the vehicle speed is greater than a predetermined maximum acceptable variation.

Embodiments of the present invention each have at least one of the above-mentioned objects and/or aspects, but do not necessarily have all of them.

Additional and/or alternative features, aspects, and advantages of the embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENT

The present invention will be described with respect to vehicles having a single throttle body, a single throttle valve, and a single throttle valve actuator, but it should be understood that vehicles having multiple throttle bodies and throttle valves with one or more throttle valve actuators are also contemplated.

The present invention will also be described with respect to a snowmobile 10, a personal watercraft 70, and an ATV 150, but it should be understood that aspects of the invention could also be used on other types of vehicles such as boats, motorcycles, or engine-powered tricycles. Each of those vehicles will now be described.

Figure 1:
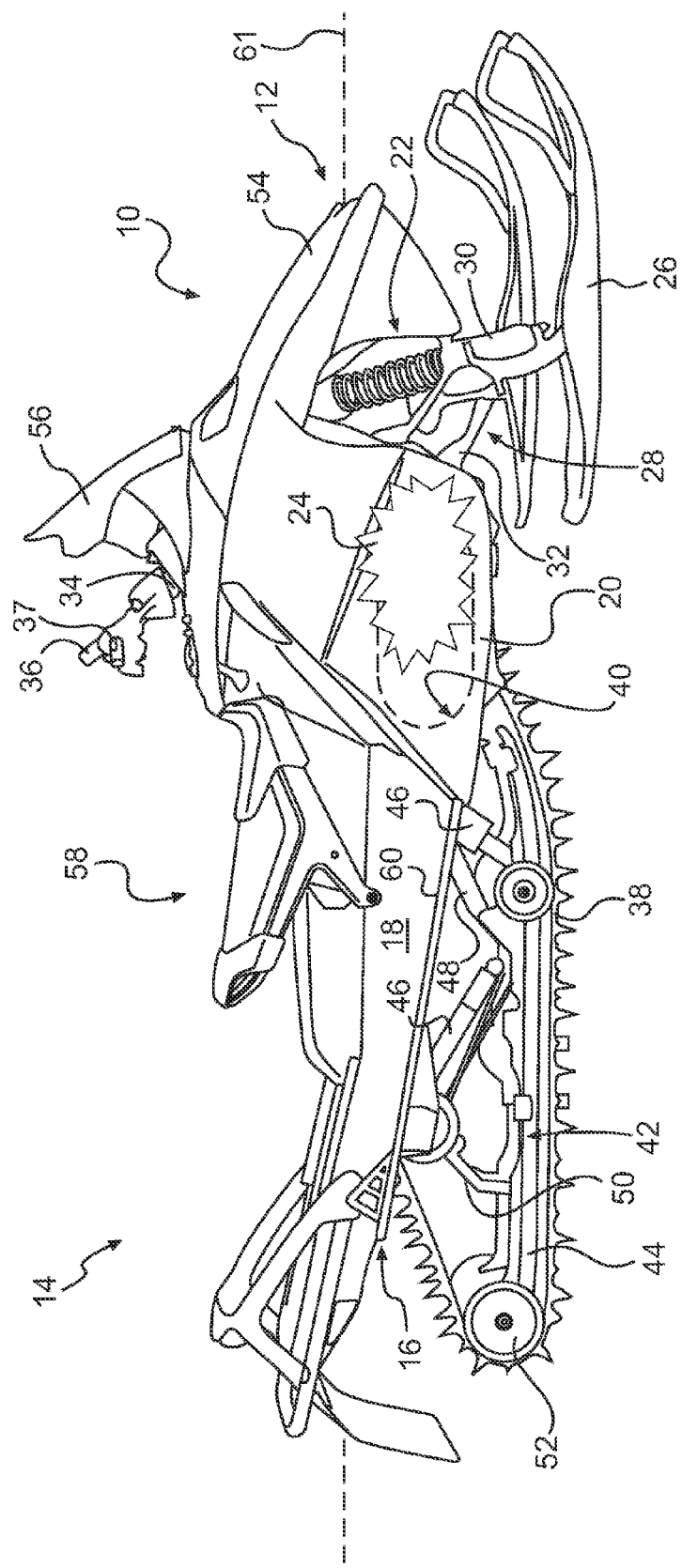
FIG. 1 is a right side elevation view of a snowmobile.

Referring to FIG. 1, a snowmobile 10 includes a forward end 12 and a rearward end 14 which are defined consistently with a travel direction of the vehicle. The snowmobile 10 includes a vehicle body in the form of a frame or chassis 16 which normally includes a rear tunnel 18, an engine cradle portion 20 and a front suspension assembly portion 22. An engine 24, which is schematically illustrated in FIG. 1, is carried by the engine cradle portion 20 of the frame 16. A ski and steering assembly (not indicated) is provided, in which two skis 26 are positioned at the forward end 12 of the snowmobile 10 and are attached to the front suspension assembly portion 22 of the frame 16 through a front suspension assembly 28. The front suspension assembly 28 includes ski legs 30, supporting arms 32 and ball joints (not shown) for operatively joining the respective ski legs 30, supporting arms 32 and a steering column 34. The steering column 34 at its upper end is attached to a steering device such as a handlebar 36 which is positioned forward of a rider and behind the engine 24 to rotate the ski legs 30 and thus the skis 26, in order to steer the vehicle. A throttle operator in the form of a finger-actuated throttle lever 37 is mounted to the handlebar 36. Other types of throttle operators, such as a thumb-actuated throttle lever and a twist grip, are also contemplated. The function of the finger-actuated throttle lever 37 will be discussed in greater detail below.

An endless drive track 38 is positioned at the rear end 14 of the snowmobile 10. The drive track 38 is disposed generally under the tunnel 18, being connected operatively to the engine 24 through a belt transmission system 40 which is schematically illustrated by broken lines in FIG. 1. Thus, the endless drive track 38 is driven to run about a rear suspension assembly 42 for propulsion of the snowmobile 10. A speed sensor (not shown) senses the speed of rotation of a shaft (not shown) transmitting power from the transmission system 40 to the endless drive track 38. An ECU (not shown in FIG. 1) connected to the speed sensor converts the rotational speed of the shaft to the speed of the snowmobile 10 in kilometers or miles per hour, depending on the rider's preference. The speed sensor could also be used to sense the rotational speed of one of the endless track 38. The speed sensor could also include a GPS unit, in which case the speed of the snowmobile 10 would be determined by calculating the change in position of the snowmobile 10 over a period of time based on information obtained from the GPS unit.

The rear suspension assembly 42 includes a pair of slide rails 44 in sliding contact with the endless drive track 38. The rear suspension assembly 42 also includes one or more shock absorbers 46 which may further include a coil spring (not shown) surrounding the individual shock absorbers 46. Front and rear suspension arms 48 and 50 are provided to attach the slide rails 44 to the frame (chassis) 16. One or more idler wheels 52 are also provided in the rear suspension assembly 42.

At the front end 12 of the snowmobile 10, fairings 54 enclose the engine 24 and the belt transmission system 40, thereby providing an external shell that not only protects the engine 24 and the belt transmission system 40, but can also be decorated to make the snowmobile 10 more aesthetically pleasing. Typically, the fairings 54 include a hood (not indicated) and one or more side panels which can be opened to allow access to the engine 24 and the belt transmission system 40 when this is required, for example, for inspection or maintenance of the engine 24 and/or the belt transmission system 40. In the particular snowmobile 10 shown in FIG. 1, the side panels can be opened along a vertical axis to swing away from the snowmobile 10. A windshield 56 may be connected to the fairings 54 near the front end 12 of the snowmobile 10 or directly to the handlebar 36. The windshield 56 acts as a wind screen to lessen the force of the air on the rider while the snowmobile 10 is moving.

The engine 24 is a type of internal combustion engine that is supported on the frame 16 and is located at the engine cradle portion 20. The internal construction of the engine 24 may be of any known type, however the engine 24 drives an engine output shaft (not shown) that rotates about a horizontally disposed axis that extends generally transversely to a longitudinal centerline 61 of the snowmobile 10. The engine output shaft drives the belt transmission system 40 for transmitting torque to the endless drive track 38 for propulsion of the snowmobile 10.

A straddle-type seat 58 is positioned atop the frame 16 and extends from the rear end 14 of the snowmobile 10 to the fairings 54. A rear portion of the seat 58 may include a storage compartment or can be used to accommodate a passenger seat (not indicated). Two footrests 60 are positioned on opposite sides of the snowmobile 10 below the seat 58 to accommodate the driver's feet.

Figure 2:
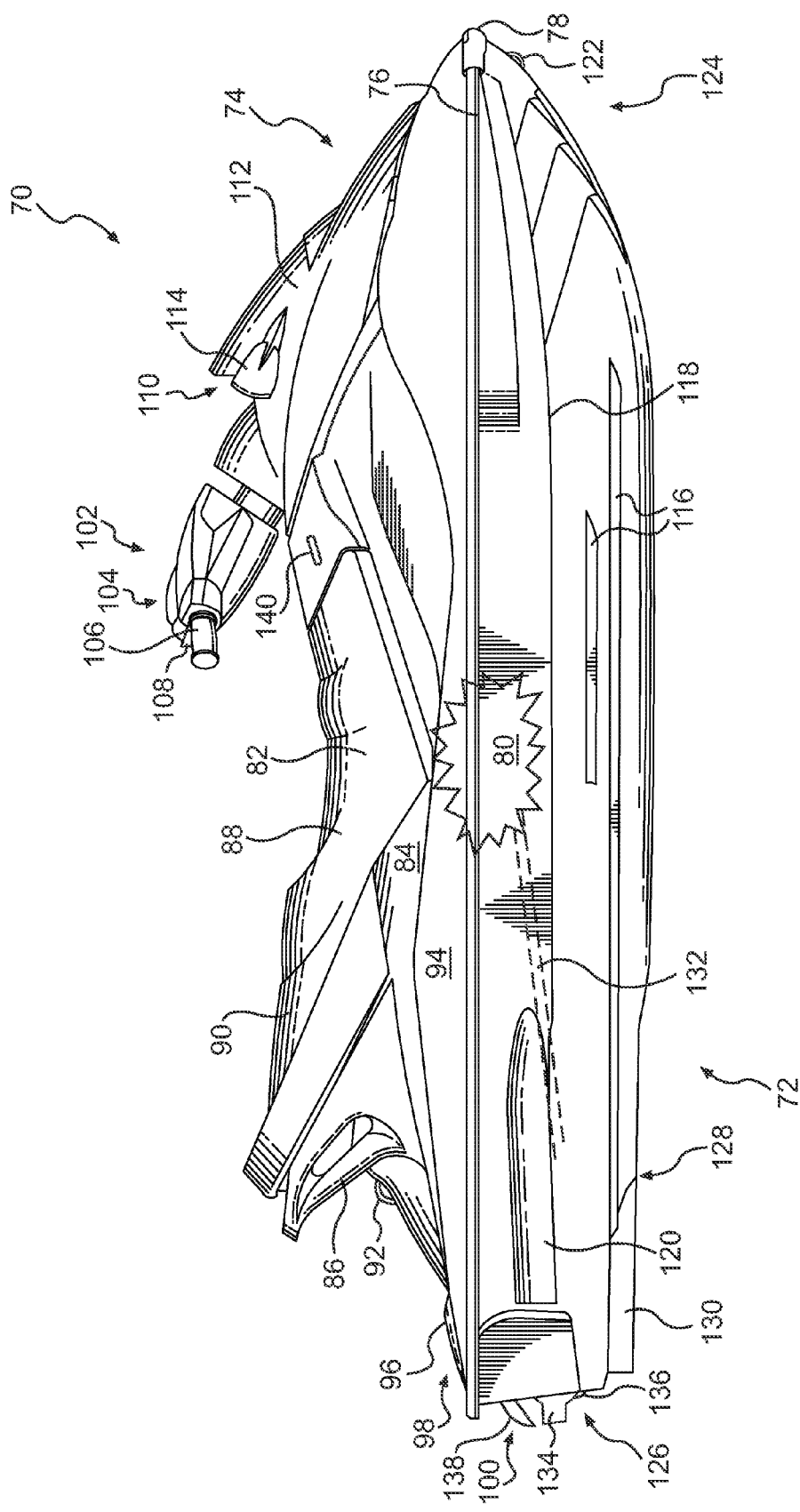
FIG. 2 is a right side elevation view of a personal watercraft.

Turning now to FIG. 2, a personal watercraft 70 has a vehicle body made of two main parts. These parts of the watercraft 70 are the hull 72 and the deck 74. The hull 72 buoyantly supports the watercraft 70 in the water. The deck 74 is designed to accommodate a rider and, in some watercraft, one or more passengers. The hull 72 and deck 74 are joined together at the bond line 76 by an adhesive. Rivets or other fasteners may also join the hull 72 and deck 74. A bumper 78 generally covers the bond line 76 helping to prevent damage to the outer surface of the watercraft 70 when the watercraft 70 is docked. The volume created between the hull 72 and the deck 74 is known as the engine compartment (not shown). The engine compartment accommodates the engine 80 (schematically illustrated in FIG. 2) as well as the exhaust system, gas tank, electrical system (battery, electronic control unit . . . ), air box, storage bins (not shown) and other elements required or desired for the watercraft 70. One of the challenges when designing a watercraft 70 is to fit all of these elements into this relatively small volume.

As seen in FIG. 2, the deck 74 has a centrally positioned straddle-type seat 82 placed on top of a pedestal 84 to accommodate a rider in a straddling position. A grab handle 86 is provided between the pedestal 84 and the straddle-type seat 82 at the rear of the straddle-type seat 82 to provide a handle onto which a passenger may hold on. The straddle-type seat 82 may comprise a first and second seats 88 and 90 respectively. First and second seats 88, 90 are preferably removably attached to the pedestal 84 by a hook and tongue assembly (not shown) at the front of each seat 88, 90 and by a latch assembly (not shown) at the rear of each seat 88, 90, or by any other known attachment mechanism. One of the seats 88, 90 covers an engine access opening (not shown), defined by a top portion of the pedestal 84, which provides access to the engine 80, and the other of the seats 88, 90 will generally cover a removable storage box (not shown). A glove box may also be provided in front of the straddle type seat 82. A tow hook 92 is also placed on a rear portion of the pedestal 84 to allow watercraft 70 to tow, for example, a water-skier or an inflatable water toy.

The watercraft 70 has a pair of generally upwardly extending walls located on either side of the watercraft 70 known as gunwales or gunnels 94. The gunnels 94 help to prevent the entry of water in the watercraft 70, provide lateral support for the rider's feet, and also provide buoyancy when turning the watercraft 70, since personal watercraft roll slightly when turning. Towards the rear of the watercraft 70 the gunnels 94 extend inwardly to act as heel rests 96. Heel rests 96 allow a passenger riding the watercraft 70 facing the towards the rear, to spot a water-skier for example, to place his heels on the heel rests 96, thereby providing him with a more stable riding position. It should be noted that heel rests 96 could also be separate from the gunnels 94.

Located on either side of the pedestal 84, between the pedestal 84 and the gunnels 94 are a pair of footrests (not shown). The footrests are designed to accommodate a rider's feet in various riding positions. To this effect the forward portions of the footrests are angled upwardly. The remaining portions of the footrests are generally horizontal. The footrests may be covered by carpeting made of a rubber-type material to provide additional comfort and feet traction for the rider. A reboarding platform 98 is provided at the rear of the watercraft 70 to allow the rider or a passenger to easily reboard the watercraft 98 from the water. Carpeting may also cover the reboarding platform 98. A retractable ladder (not shown) may be affixed to the transom 100 to facilitate boarding the watercraft 70 from the water onto the reboarding platform 98.

A handlebar or helm assembly 102 is positioned forwardly of the straddle-type seat 82. The helm assembly 102 has a central helm portion 104, that may be padded, and a pair of steering handles 106. One of the steering handles 106 is provided with a throttle operator in the form of a thumb-actuated throttle lever 108. Other types of throttle operators, such as a finger-actuated throttle lever and a twist grip, are also contemplated. The function of the thumb-actuated throttle lever 108 will be discussed in greater detail below. The central helm portion 104 may also have buttons (not shown) that allow the rider to modify what is displayed (speed, engine rpm, time . . . ) on the display cluster 110 located forwardly of the helm assembly 102, to change a condition of the watercraft 70 such as trim (the pitch of the watercraft 70), or to engage a watercraft operation mode such as a cruise control mode. The helm assembly 102 may also be provided with a key receiving post (not shown), preferably located near a center of the central helm portion 104. The key receiving post is adapted to receive a key attached to a lanyard so as to allow starting of the watercraft 70. It should be noted that the key receiving post may be placed in any suitable location on the watercraft 2.

The watercraft 70 is provided with a hood 112 located forwardly of the helm assembly 102. A hinge (not shown) is attached between a forward portion of the hood 112 and the deck 74 to allow the hood 112 to move to an opened position to provide access to a front storage bin (not shown). A latch (not shown) located at a rearward portion of hood 112 locks the hood 112 into a closed position. When in the closed position, the hood 112 prevents water from entering front storage bin. Rearview mirrors 114 are positioned on either side of the hood 112 to allow the rider to see behind him.

The hull 72 is provided with a combination of strakes 116 and chines 118. A strake 116 is a protruding portion of the hull 72. A chine 118 is the vertex formed where two surfaces of the hull 72 meet. It is this combination of strakes 116 and chines 118 that will give the watercraft 70 its riding and handling characteristics.

Sponsons 120 are located on either of the hull 72 near the transom 100. The sponsons 120 have an arcuate undersurface, which give the watercraft 70 both lift while in motion and improved turning characteristics.

A hook 122 is located at the bow 124 of the watercraft 70. The hook 122 is used to attach the watercraft 70 to a dock when it is not in use.

The watercraft 70 is propelled by a jet pump 126. It is contemplated that other types of propulsion system, such as propellers, could be used. The jet pump 126 pressurizes water and accelerates it to create thrust. The water is first scooped from under the hull 72 through an inlet grate 128. The inlet grate 128 prevents large rocks, weeds, and other debris from entering the jet propulsion system 126 since they may damage it or negatively affect its performance. Water then flows through the water intake ramp (not shown).

From the intake ramp, water then enters the jet pump 126. The jet pump 126 is located in what is known as the tunnel (not shown). The tunnel is opened towards the rear, is defined at the front, sides, and top by the hull, and at the bottom by the ride plate 130. The ride plate 130 is the surface on which the watercraft 70 rides or planes. The jet pump 126 is made of two main parts: the impeller (not shown) and the stator (not shown). The impeller is coupled to the engine 80 by one or more shafts 132, such as a driveshaft and an impeller shaft. The rotation of the impeller pressurizes the water, which then moves over the stator that is made of a plurality of fixed stator blades (not shown). The role of the stator blades is to decrease the rotational motion of the water so that almost all the energy given to the water is used for thrust, as opposed to swirling the water. Once the water leaves the jet pump 126, it goes through the venturi (not shown). Since the venturi's exit diameter is smaller than its entrance diameter, the water is accelerated further, thereby providing more thrust. A steering nozzle 134 is pivotally attached to the venturi through a vertical pivot point. The steering nozzle 134 is operatively connected to the helm assembly 102 via a push-pull cable (not shown) such that when the helm assembly 102 is turned, the steering nozzle 134 pivots, redirects the water coming from the venturi, so as to steer the watercraft 70 in the desired direction. In some watercraft, the steering nozzle 134 may be gimballed to allow it to move around a second horizontal pivot axis. The up and down movement of the steering nozzle 134 provided by this additional pivot axis is known as trim, and controls the pitch of the watercraft 70.

When the watercraft 70 is in movement, its speed is measured by a speed sensor 136 attached to the transom 100 of the watercraft 70. The speed sensor 136 has a paddle wheel which is turned by the flow of water, therefore the faster the watercraft 70 goes, the faster the paddle wheel turns. An ECU (not shown in FIG. 2) connected to the speed sensor 136 converts the pulse of the rotational speed of the rotational speed of the paddle wheel to the speed of the watercraft 70 in kilometers or miles per hour, depending on the rider's preference. The speed sensor 136 may also be placed in the ride plate 130 or any other suitable position. Other types of speed sensors, such as pitot tube, could also be used. The speed sensor 136 could also include a GPS unit, in which case the speed of the watercraft 70 would be determined by calculating the change in position of the watercraft 70 over a period of time based on information obtained from the GPS unit.

Some watercraft 70 have the ability to move in a reverse direction. To do this a reverse gate 138 is used. The reverse gate 138 is pivotally attached to the sidewalls of the tunnel or directly on the venturi or the steering nozzle 134. To make the watercraft 70 move in a reverse direction, the rider pulls on a reverse handle 140 operatively connected to the reverse gate 138. The reverse gate 138 then pivots in behind the steering nozzle 134 and redirects the water leaving the jet pump 126 towards the front of the watercraft 70, thereby thrusting the watercraft 70 rearwardly.

Figure 3:
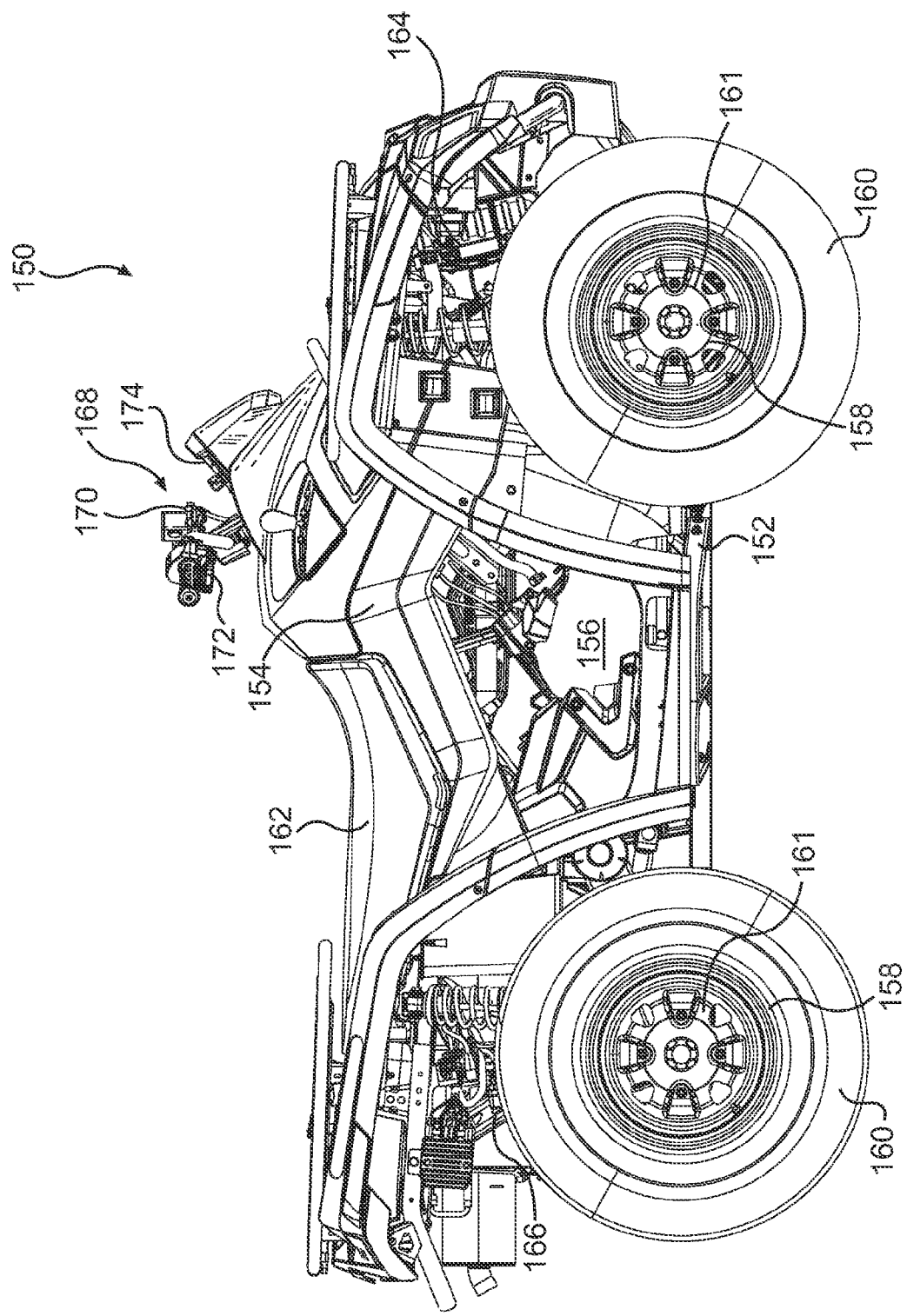
FIG. 3 is a right side elevation view of an ATV.

Turning now to FIG. 3, an ATV 150 includes a frame 152 (portions of which are shown in FIG. 3) to which is mounted a body 154 and an internal combustion engine 156 for powering the vehicle. Also connected to the frame 152 are at least three but preferably four wheels 158 with low-pressure balloon tires 160 mounted rims 161 having a diameter from 25 to 36 cm. It is contemplated that the ATV 150 could have only three wheels 158. The low-pressure balloon tires 160 are inflated to a pressure of no more than 2 kg/cm$^2$ (i.e., no more than 196 kPa or 28 psi) and are adapted for off-road conditions and traversing rugged terrain. The ATV 150 further includes a straddle seat 162 mounted to the frame 152 for supporting a driver and optionally one or more passengers.

The two front wheels 158 are suspended from the frame 152 by respective front suspension assemblies 164 while the two rear wheels 158 are suspended from the frame 152 by respective rear suspension assemblies 166.

Still referring to FIG. 3, the ATV 150 further includes a steering assembly 168 which is rotationally supported by the frame 152 to enable a driver to steer the vehicle. The steering assembly 168 includes a handlebar 170 connected to a steering column (not shown) for actuating steering linkages connected to left and right front wheels 158. A throttle operator in the form of a thumb-actuated throttle lever 172 is mounted to the handlebar 170. Other types of throttle operators, such as a finger-actuated throttle lever and a twist grip, are also contemplated. The function of the thumb-actuated throttle lever 172 will be discussed in greater detail below. A display cluster 174 is disposed forwardly of the steering assembly 168 to display information such as the speed of the ATV 150 and the speed of rotation of the engine 156.

A transmission (not shown) is operatively connected between the engine 156 and the wheels 158 as is known in the art. A shifter located near the steering assembly 168 enables a driver to select one of a plurality of drive modes for the vehicle. The drive modes include park, neutral, reverse, low, and drive. A speed sensor (not shown) senses the speed of rotation of one of the shafts (not shown) transmitting power from the transmission to the wheels 158. An ECU (not shown in FIG. 2) connected to the speed sensor converts the rotational speed of the shaft to the speed of the ATV 150 in kilometers or miles per hour, depending on the rider's preference. The speed sensor could also be used to sense the rotational speed of one of the wheels 158. The speed sensor could also include a GPS unit, in which case the speed of the ATV 150 would be determined by calculating the change in position of the ATV 150 over a period of time based on information obtained from the GPS unit.

Figure 4:
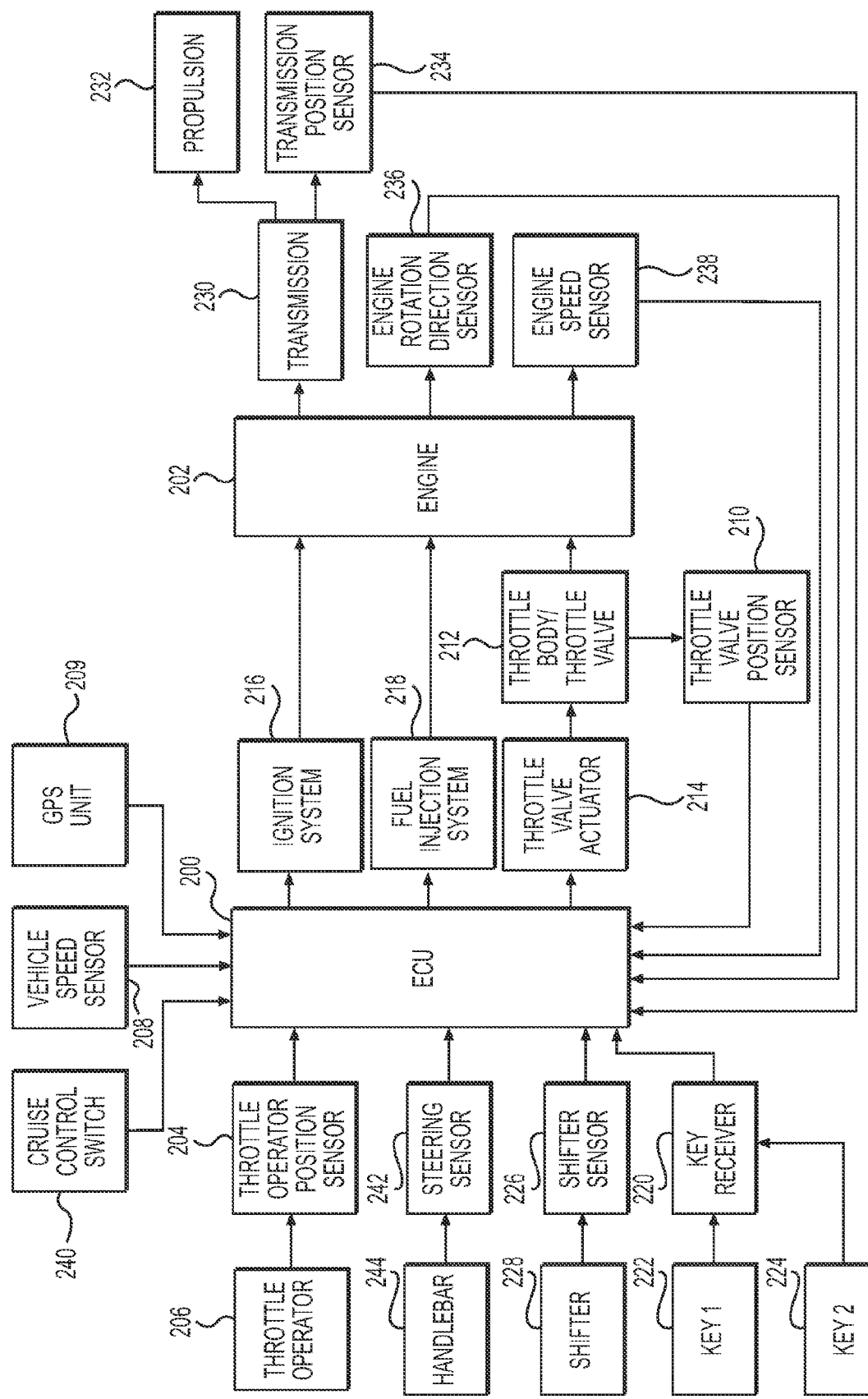
FIG. 4 is a schematic representation of the various sensors and vehicle components present in a vehicle in accordance with the present invention.

Turning now to FIG. 4, the various sensors and vehicle components present in a vehicle in accordance with the present invention, such as those described above, will now be described. As it would be understood by those skilled in the art, not every sensor or component illustrated in FIG. 4 is required to achieve aspects of the present invention. As would also be understood by those skilled in the art, depending on the particular aspect of the invention, some of the sensors and components could be omitted, some of the sensors and components could be substituted by other types of sensor and components, and two or more sensors could be combined in a single sensor that can be used to perform multiple functions without departing from the scope of the present invention. For simplicity, and since like elements were given different reference numerals in the above description of the various vehicles, these elements (such as the engine, ECU, and transmission) will be given a new reference numeral which will be used for the remainder of the description, unless specific reference is being made to one of the above-described vehicles.

As can be seen in FIG. 4, the ECU 200 is in electronic communication with various sensors from which it receives signals and uses these signals to control the operation of the ignition system 216, the fuel injection system 218 in the case of a fuel injected engine, and the throttle valve actuator 214 in order to control the engine 202. The specific methods by which the ECU 200 controls the engine 202 will be described in more detail below.

A throttle operator position sensor 204 senses a position of the throttle operator 206 and sends a signal representative of the throttle operator position to the ECU 200. The throttle operator 206 can be of any type, but is preferably selected from a group consisting of a thumb-actuated throttle lever, a finger-actuated throttle lever, and a twist grip. The throttle operator 206 is normally biased, typically by a spring, towards a position that is indicative of a desire for an idle operation of the engine 202. In the case of a thumb or finger-actuated throttle lever, this corresponds to the position where the lever is furthest away from the handle to which it is mounted. Depending on the type of throttle operator 206, the throttle operator position sensor 204 is generally disposed in proximity to the throttle operator 206 and senses the movement of the throttle operator 206 or the linear displacement of a cable connected to the throttle operator 206. The throttle operator position sensor 204 is preferably in the form of a magnetic position sensor. In this type of sensor, a magnet is mounted to the throttle operator 206 and a sensor chip is fixedly mounted in proximity to the magnet. As the magnet moves, due to movement of the throttle operator 206, the magnetic field sensed by the sensor chip varies. The sensor chip transmits a voltage corresponding to the sensed magnetic field, which corresponds to the position of the throttle operator 206, to the ECU 200. It is contemplated that the sensor chip could be the one mounted to the throttle operator 206 and that the magnet could be fixedly mounted in proximity to the sensor chip. The throttle operator position sensor 204 could also be in the form of a rheostat. A rheostat is a resistor which regulates current by means of variable resistance. In the present case, the position of the throttle operator 206 would determine the resistance in the rheostat which would result in a specific current being transmitted to the ECU 200. Therefore, this current is representative of the position of the throttle operator 206. It is contemplated that other types of sensors could be used as the throttle operator position sensor 204, such as a potentiometer which regulates voltage instead of current.

A vehicle speed sensor 208 senses the speed of the vehicle and sends a signal representative of the speed of the vehicle to the ECU 200. In addition to using this signal to control the engine 202, as will be described below, the ECU 200 sends a signal to a speed gauge located in the display cluster (110 in FIG. 2, 174 in FIG. 3) of the vehicle such that the speed gauge displays the vehicle speed to the driver of the vehicle. The vehicle speed sensor 208 can be of any type. The vehicle speed sensor 208 can, for example, sense the speed of rotation of a wheel of the vehicle or of one of the shafts transmitting power to the wheel which is then converted to or associated with a vehicle speed by the ECU 200 or by a separate circuit associated with the vehicle speed sensor 208. The vehicle speed sensor 208 could also be a pitot tube which is used to determine the speed of the vehicle by using the static and dynamic fluid pressures (air or water pressure depending on the vehicle type). In a watercraft, the vehicle speed sensor 208 could also use a paddle wheel, the specifics of which were explained above with respect to personal watercraft 70. Alternatively, the vehicle speed sensor 208 could include a global positioning system (GPS unit 209). By using information from the GPS unit 209, the speed of the vehicle can be determined by calculating a change in position of the vehicle over a period of time which is normally a function of the GPS unit.

A throttle valve position sensor 210 senses the position (i.e. the degree of opening) of the throttle valve 212 and sends a signal representative of the position of the throttle valve 212 to the ECU 200. The throttle valve position sensor 210 acts as a feedback to the ECU 200 since the ECU 200 uses the signal received from the throttle valve position sensor 210 to determine if the throttle valve actuator 214 has moved the throttle valve 212 to the desired position and can make adjustments accordingly, as will be described in greater detail below. The ECU 200 can also use the signal from the throttle valve position sensor 210 actively to control the ignition system 216 and the fuel injection system 218 along with other signals depending on the specific control scheme used by the ECU 200. The throttle valve position sensor 210 can be any suitable type of sensor such as a rheostat and a potentiometer as described above with respect to the throttle operator position sensor 204. Depending on the type of throttle valve actuator 214 being used, a separate throttle valve position sensor 210 may not be necessary. For example, a separate throttle operator position sensor 204 would not be required if the throttle valve actuator 214 is a servo motor since servo motors integrate their own feedback circuit that corrects the position of the motor and thus have an integrated throttle position sensor 204.

A key receiver 220 is disposed on the vehicle body and is in electronic communication with the ECU. The key receiver 220 is adapted to receive a key 222. In a first embodiment, the key 222 is in inserted in the key receiver 220 and if it is the correct key 222, the key 222 can be turned in the key receiver 220 and a signal is sent to the ECU to start the engine 202. In a mechanical key receiver 220 and key 222 system, only the correct key 222 has the proper tooth pattern which will allow it to be turned in the key receiver 220. In an electronic key receiver 220 and key 222 system, an electronic chip in or on the key 222 contains a code identifying the key 222. When the key 222 is inserted in the key receiver 220, a signal representative of the code is sent to the ECU 200 and the engine 202 will only start if the chip on the key 222 contains the proper code. In a preferred embodiment, the key receiver 220 and key 222 system is an electronic system as described above, but instead of turning the key 222 in the key receiver 220 to start the engine 202, there is a separate "start/stop" button that needs to be pressed by the driver of the vehicle to start the engine 202 once the key 222 is inserted in the key receiver 220. Once the engine 202 has been started, pressing the "start/stop" button or removing the key 222 from the key receiver 220 will send a signal to the ECU 200 to stop the engine 202. The key 222 is preferably attached to a lanyard that can be attached to the driver of the vehicle, such that if the driver becomes separated from the vehicle, the key 222 will be removed from the key receiver 220, causing the engine 202, and therefore the vehicle, to stop. In the preferred embodiment, the vehicle has more than one key 222 that will permit the engine 202 to be started. For each of these keys, keys 222 and 224 for example, the electronic chip also contains information regarding the performance limits of the vehicle or engine 202, such as maximum vehicle speed, engine speed, or engine torque, as will be described in further detail below. A signal representative of this information is sent to the ECU 200 when the key 222 or 224 is inserted in the key receiver 220. For example key 222 may permit the vehicle to operate up to a speed of 100 km/hour, while key 224 limits the maximum speed to 30 km/hour. U.S. Pat. No. 6,772,061, entitled "System, Method, and Apparatus for Controlling Vehicle Performance", issued on Aug. 3, 2004, the entirety of which is incorporated herein by reference, describes a system where the vehicle performance is restricted based on information contained on a key.

A vehicle operation direction sensor senses the vehicle operation direction and sends a signal representative of the vehicle operation direction (i.e. the forward or reverse direction of travel) to the ECU 200. The vehicle operation direction sensor can be in the form of a shifter sensor 226 for sensing the vehicle operation direction selected by a shifter 228 of the vehicle and sending a signal representative of the direction to the ECU 200. Although contemplated, the shifter sensor 226 does not need to sense every possible position of the shifter 228. Instead, the shifter sensor could be adapted to sense only if the shifter 228 is in a position indicative of a reverse vehicle operation direction (e.g. that the reverse gear has been selected by the shifter for a vehicle equipped with a transmission). Alternatively, for vehicle equipped with a transmission 230 having one or more forward gears and at least one reverse gear and which is operatively connected between the engine 202 and the propulsion 232 (the wheels for example), the vehicle operation direction sensor can be in the form of a transmission position sensor 234 for sensing which of the gears has been selected by the shifter 228 to determine the vehicle operation direction. Alternatively, the vehicle operation direction sensor can be in the form of an engine rotation direction sensor 236. As described in U.S. Pat. No. 5,794,574, entitled "System for Reversing 2 Stroke Engine", issued Aug. 18, 1998, the entirety of which is incorporated herein by reference, it is possible to reverse the direction of rotation of the engine 202 and therefore reverse the vehicle operation direction by doing so. Therefore, in vehicles using such an engine control strategy, it is possible to determine the vehicle operation direction by using an engine rotation direction sensor 236 to sense the direction of rotation of the engine 202. It is contemplated that the engine speed sensor 238, described below, could be used to perform the function of the engine rotation direction sensor 236. It is also contemplated that the vehicle speed sensor 208 (depending on its type) or the GPS unit 209 could be used as the vehicle operation direction sensor.

An engine speed sensor 238 senses a speed of rotation of the engine 202 and sends a signal representative of the speed of rotation of the engine 202 to the ECU 200. Typically, an engine, such as engine 202, has a toothed wheel disposed on and rotating with a shaft of the engine, such as the crankshaft or output shaft. The engine speed sensor 238 is located in proximity to the toothed wheel and sends a signal to the ECU 200 each time a tooth passes in front it. The ECU 200 can then determine the engine rotation speed by calculating the time elapsed between each signal. The speed of rotation of the engine can be used by the ECU 200 to calculate the engine torque. Should the vehicle speed sensor 208 fail, embodiments of the present invention will then move to an engine control strategy which uses the signal from the engine speed sensor 238, as will be explained below.

A cruise control switch 240 in electronic communication with the ECU 200 is used to engage and disengage a cruise control operation mode of the engine 202 where the vehicle will operate at a constant speed, as will be described in greater detail below. The cruise control switch 240 can be a dedicated switch or it could be combined with a switch already present on the vehicle. For example, most personal watercraft, such as personal watercraft 70, have a "set" and a "mode" button to control functions on the display cluster, one of which could perform its normal function when pressed and release immediately and could be used to engage or disengage the cruise control mode when pressed for a longer period of time.

A steering sensor 242 senses a turning of the handlebar 244 and sends a signal representative of the orientation of the handlebar to the ECU 200. The steering sensor 242 can be in the form of a rheostat or magnetic switches which are activated when the handlebar 244 is turned beyond a certain angle. Although it could be used on other types of vehicles, the steering sensor 242 would preferably be used in a personal watercraft, such as personal watercraft 70. Since personal watercraft are steered by redirecting the jet of water created by the jet pump, the amount of steering provided at low engine speeds may be insufficient to accomplish some tasks. Therefore the steering sensor 242 can be used in controlling the engine 202 in what is known as an off-throttle steering operation mode. In the off-throttle steering operation mode, when the engine speed is below a predetermined engine speed, the ECU 200 causes the engine speed to be increased upon receiving a signal from the steering sensor 242 that the handlebar 244 has been turned, as will be described in greater detail below. This will provide additional steering capability. U.S. Pat. No. 6,405,669, entitled "Watercraft with Steer-Response Engine Speed Controller", issued on Jun. 18, 2002, the entirety of which is incorporated herein, describes a system for controlling an engine in an off-throttle steering operation mode.

Figure 5:
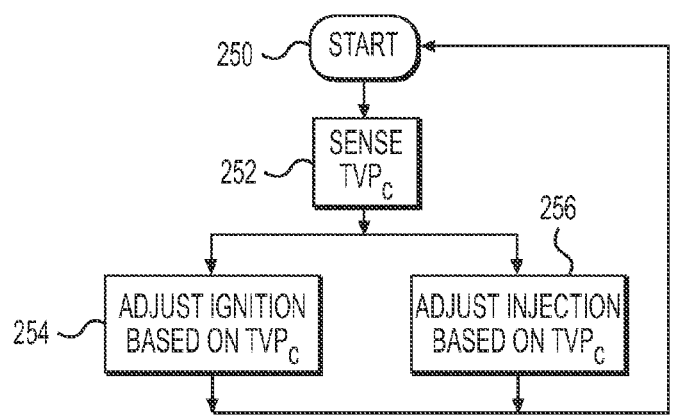
FIG. 5 is a logic diagram illustrating a basic control of the engine's ignition and fuel injection systems.

Turning now to FIG. 5, a method of controlling of the ignition system 216 and fuel injection systems 218 is illustrated. As would be understood by those skilled in the art, actual methods of controlling these systems are more complex than what is illustrated in FIG. 5. FIG. 5 is provided to give a basic understanding of such a method. The first step 252 of the method consists in sensing the current position of the throttle valve 212 ($TVP_C$) by using the throttle valve position sensor 210. Based on the $TVP_C$, the ECU 200 adjusts the ignition at step 254 and the injection at step 256. Although shown as occurring in parallel, it should be understood that steps 254 and 256 could occur in series. Step 254 can consist of adjusting the timing of the ignition and/or changing the number of sparks per ignition event. Step 256 can consist of adjusting the timing of the fuel injection and/or changing the quantity of fuel being injected per ignition event. The ECU 200 determines the adjustments for steps 254, 256 by obtaining the ignition and injection values from engine control maps stored in its memory which correspond to the $TVP_C$. Alternatively, the ECU 200 could find the values corresponding to a change over time in the $TVP_c$ or by applying an algorithm based on the $TVP_C$. Although not illustrated in FIG. 5, it is contemplated that the ECU 200 could use at least one additional input obtained from one of the sensors shown in FIG. 4 to perform steps 254 and 256, such as the engine speed sensor 238. After completing steps 254 and 256, the ECU returns to the start 250 of the method and repeats steps 252 to 256 again. An increase in the degree of opening of the throttle valve 212 results in an increase in the speed of the engine 202, while a decrease in the degree of opening of the throttle valve 212 results in a decrease in the speed of the engine 202.

As will become apparent, some embodiments of the present invention rely on the current speed of the vehicle as obtained by the vehicle speed sensor 208 to control the engine 20. However, under some conditions, the speed of the vehicle sensed by the vehicle speed sensor 208 can be different from the actual speed of the vehicle. For example, during operation, a personal watercraft, such as personal watercraft 70, can sometimes lose contact with the surface of the water in which it is being operated due to rough water conditions. If this watercraft is equipped with a vehicle speed sensor 208 in the form of a paddle wheel or pitot tube, as described above, when the paddle wheel is no longer in contact with the water, it will start to spin more slowly which results in the vehicle speed sensor 208 reading a speed of the vehicle which is much lower than the actual current speed of the vehicle. This would result in the ECU 200 improperly controlling the engine 200 since the ECU 200 would attempt to control the engine 202 on a sensed speed which is different from the actual speed of the vehicle. Similar conditions may exist in other vehicles and with different types of vehicle speed sensors 208.

Figure 6:
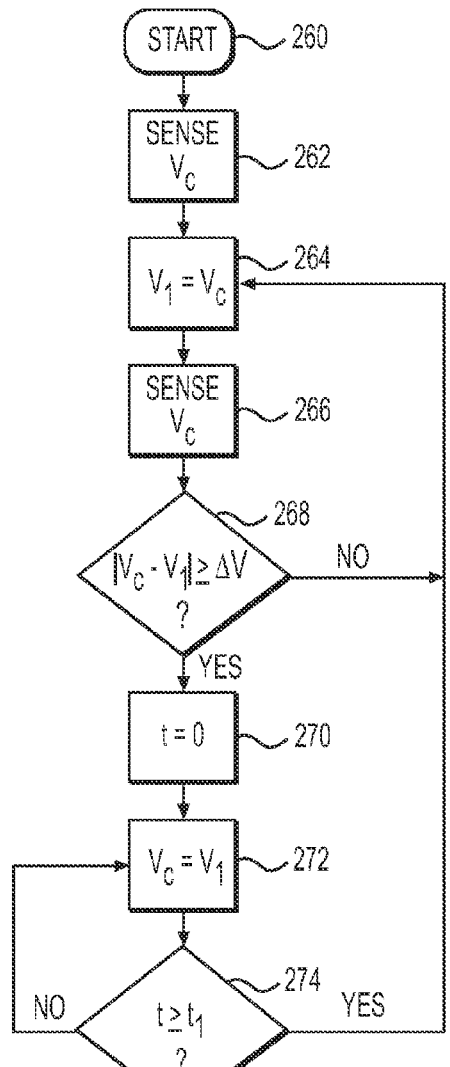
FIG. 6 is a logic diagram illustrating a control scheme adopted by the ECU when a sudden variation in vehicle speed occurs.

As shown in FIG. 6, the ECU 200 can be programmed to ignore large variations in the readings for a short period of time by the vehicle speed sensors 208 that can occur during the operation of the vehicle. After initiating the program (step 260), the first step 262 consists in sensing the current speed of the vehicle ($V_C$) by using the vehicle speed sensor 208. The ECU 200 then stores the value of $V_C$ in its memory as the value of $V_1$ at step 264. The current speed of the vehicle ($V_C$) is then sensed once again by using the vehicle speed sensor 208 at step 266. At step 268, the ECU 200 then compares the value of $V_C$ sensed at step 266 to the value of $V_1$ (which corresponds to the previously sensed value of $V_C$). If the difference between $V_C$ and $V_1$ is less than a predetermined maximum acceptable variation in vehicle speed ($\Delta V$), the ECU 200 uses the value of $V_C$ sensed at step 266 to control the engine 202. The ECU then returns to step 264 where the value of $V_C$ sensed at step 266 is stored as the value of $V_1$ and the program is repeated. If, at step 268, the difference between $V_C$ and $V_1$ is greater than or equal to $\Delta V$, which is indicative of an abnormal sudden variation in the vehicle speed as read by the vehicle speed sensor 208, then the ECU 200 ignores the sudden variation in the vehicle speed. To do so, a timer is initiated at step 270 (time (t) is equal to zero). The ECU 200 then uses $V_1$ as the value of $V_C$ (step 272) to control of the engine 202 rather than using the value of $V_C$ obtained from the vehicle speed sensor 208. The ECU 200 continues to use this value to control the engine 202 until a predetermined amount of time ($t_1$) has elapsed (step 274). Once the predetermined amount of time has elapsed, the program returns to step 264 and is repeated. $\Delta V$ is preferably selected to be larger than what would be normally possible for the vehicle under normal circumstance. For example, $\Delta V$ could be selected to be greater than the change of vehicle speed that would occur under the maximum possible acceleration of the vehicle. The predetermined amount of time $t_1$ is preferably selected based on the amount of time for which it is expected that a false reading should occur. This amount is generally determined experimentally. For the watercraft example given above, the amount of time would correspond to the amount of time for which it is expected that the watercraft will not be in contact with the water. Should the watercraft not be in contact with the water for longer than time $t_1$, the program upon returning to step 268 will go once again through steps 270 to 274.

Figure 7:
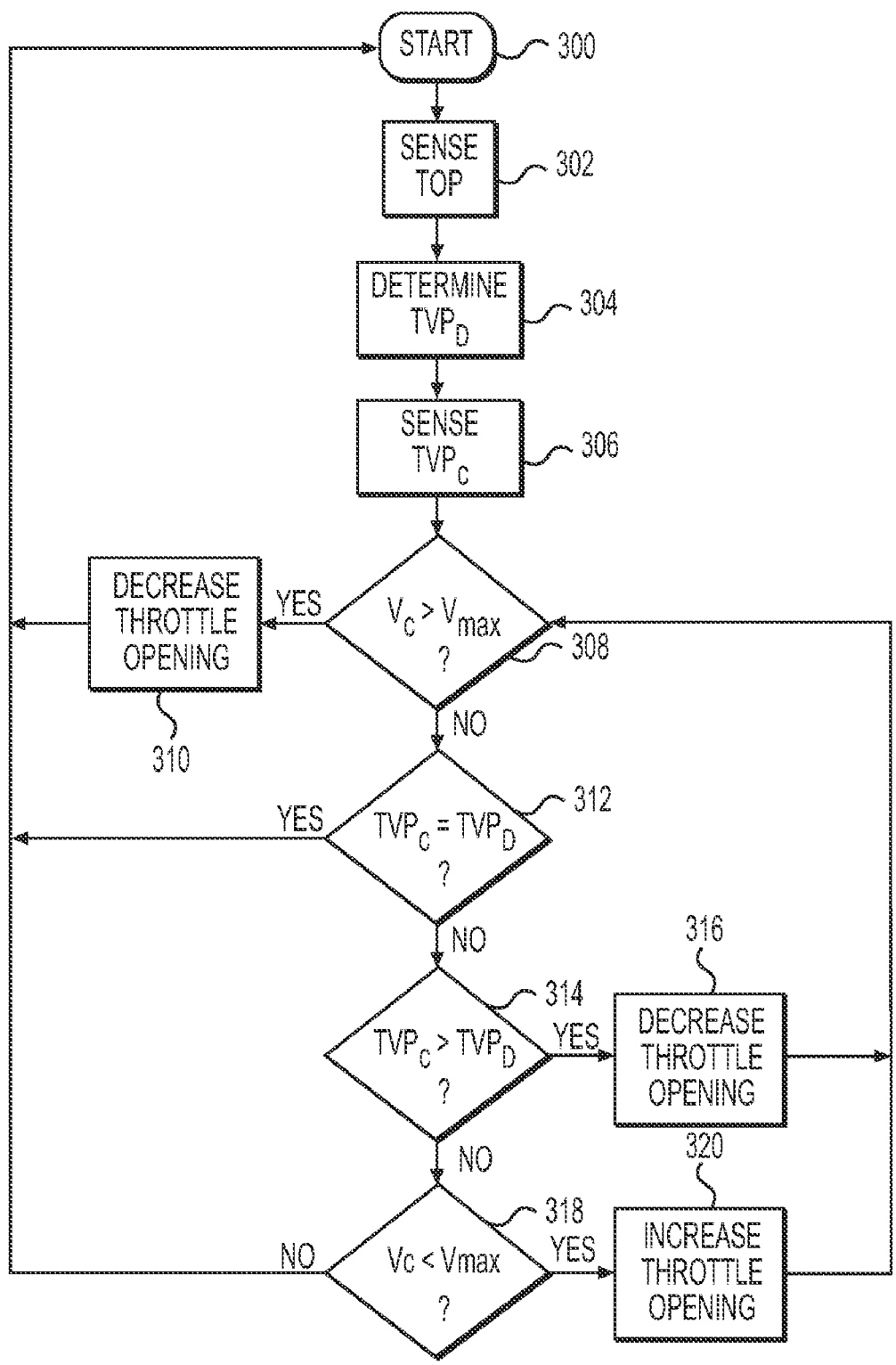
FIG. 7 is a logic diagram illustrating a method for controlling the maximum vehicle speed of a vehicle.

Turning now to FIG. 7, a method, beginning at step 300, of limiting the maximum vehicle speed will be explained. One of the advantages of limiting the maximum vehicle speed, rather then limiting the maximum engine speed or torque like in the prior art, is that regardless of the load on the vehicle (within the physical limitations of the vehicle obviously), the vehicle will be able to reach its maximum speed. In the prior art systems which limit the maximum engine speed or torque, for the same maximum engine speed or torque, the speed of the vehicle varies depending on the load of the vehicle. However, it is contemplated that the present method could be used in combination with an engine speed or torque limiting systems, such that the physical limitations of the engine 202 are not exceeded even though a maximum vehicle speed may not have been reached yet, thus preventing damage to the engine 202.

The first step 302 of the present method consists in sensing the position of the throttle operator 206 (throttle operator position (TOP)) by using the throttle operator position sensor 204. Based on the TOP, the ECU 200 then determines the corresponding position of the throttle valve 212 (desired throttle valve position ($TVP_D$)) at step 304, either by applying an algorithm, by looking for the corresponding value in a control map, or both. At step 306, the current position of the throttle valve 212 (current throttle valve position ($TVP_C$)) is sensed by the throttle valve position sensor 210. Step 306 may be omitted depending on the type of throttle valve actuator 214 being used since some throttle valve actuators 214 do not require a throttle valve position sensor 210, as explained above. Then, at step 308, the ECU 200 determines whether the current vehicle speed ($V_C$) is greater than the predetermined maximum vehicle speed ($V_{MAX}$). The value of $V_{MAX}$ can be stored in the ECU 200 by the vehicle manufacturer such that it is permanently stored in therein, or it can be contained in the key 222 or 224 used with the vehicle as explained above, or it could be manually input by a user of the vehicle, or it could also be determined by a condition of the vehicle as described below with respect to FIG. 12. If, at step 308, the current vehicle speed exceeds the predetermined maximum vehicle speed, the ECU 200 sends a signal to the throttle valve actuator 214 to decrease degree of opening of the throttle valve 212 (step 310). The ECU 200 then returns to the start 300. If, at step 308, the current vehicle speed is less than the predetermined maximum vehicle speed, then, at step 312, the ECU 200 verifies if the current throttle valve position is equal to the desired throttle valve position (as determined at step 304). If it is, then no action is taken and the ECU 200 returns to the start 300. If the current throttle valve position is not equal to the desired throttle valve position, then if the current throttle valve position is greater than the desired throttle valve position (step 314) the ECU 200 causes the throttle valve actuator 214 to decrease the degree of opening of the throttle valve 212 (step 316) and then the ECU 200 returns to step 308. If at step 314 the current throttle valve position is not greater than the desired throttle valve position and the current vehicle speed is less than the predetermined maximum vehicle speed (step 318), the ECU 200 causes the throttle valve actuator 214 to increase the degree of opening of the throttle valve 212 (step 320) and then the ECU 200 returns to step 308. If, on the other hand, at step 314 the current throttle valve position is not greater than the desired throttle valve position and the current vehicle speed is greater than the predetermined maximum vehicle speed (step 318), the ECU 200 returns to the start 300, and once it reaches step 308 it will cause the throttle valve actuator 214 to decrease degree of opening of the throttle valve 212 at step 310. Step 318 is present to ensure that the predetermined maximum speed of the vehicle has not been exceeded since step 308 has been executed. The method illustrated in FIG. 7 is such that if the current vehicle speed is equal to the predetermined maximum vehicle speed, the degree of opening of the throttle valve 212 is not increased notwithstanding a fact that the signal representative of the throttle operator position communicated to the ECU 200 indicates a desire by the driver to increase the speed of the vehicle.

Should the vehicle speed sensor 208 fail during the operation of the engine 202, the ECU 200 stops using an engine control method based on the vehicle speed, such as the one illustrated in FIG. 7, and defaults to an engine control method based on the engine speed or engine torque. The failure of the vehicle speed sensor 208 may be due to an electrical problem, an electronic problem (loss of the GPS signal when a GPS unit is used for example), a mechanical failure of the sensor 208 (a broken paddle on a paddle wheel type of sensor for example), or by debris (a clogged pitot tube for example). During the engine control method based on the engine speed or engine torque, the ECU 200 limits the operation of the engine 202 to one of a default maximum engine speed and a default maximum engine torque, instead of a maximum vehicle speed as in FIG. 7. The default maximum engine speed or the default maximum engine torque is preferably selected such that when the engine 202 operates at the default maximum engine speed or the default maximum engine torque, the vehicle speed is less than the predetermined maximum vehicle speed of the method of FIG. 7.

Figure 8:
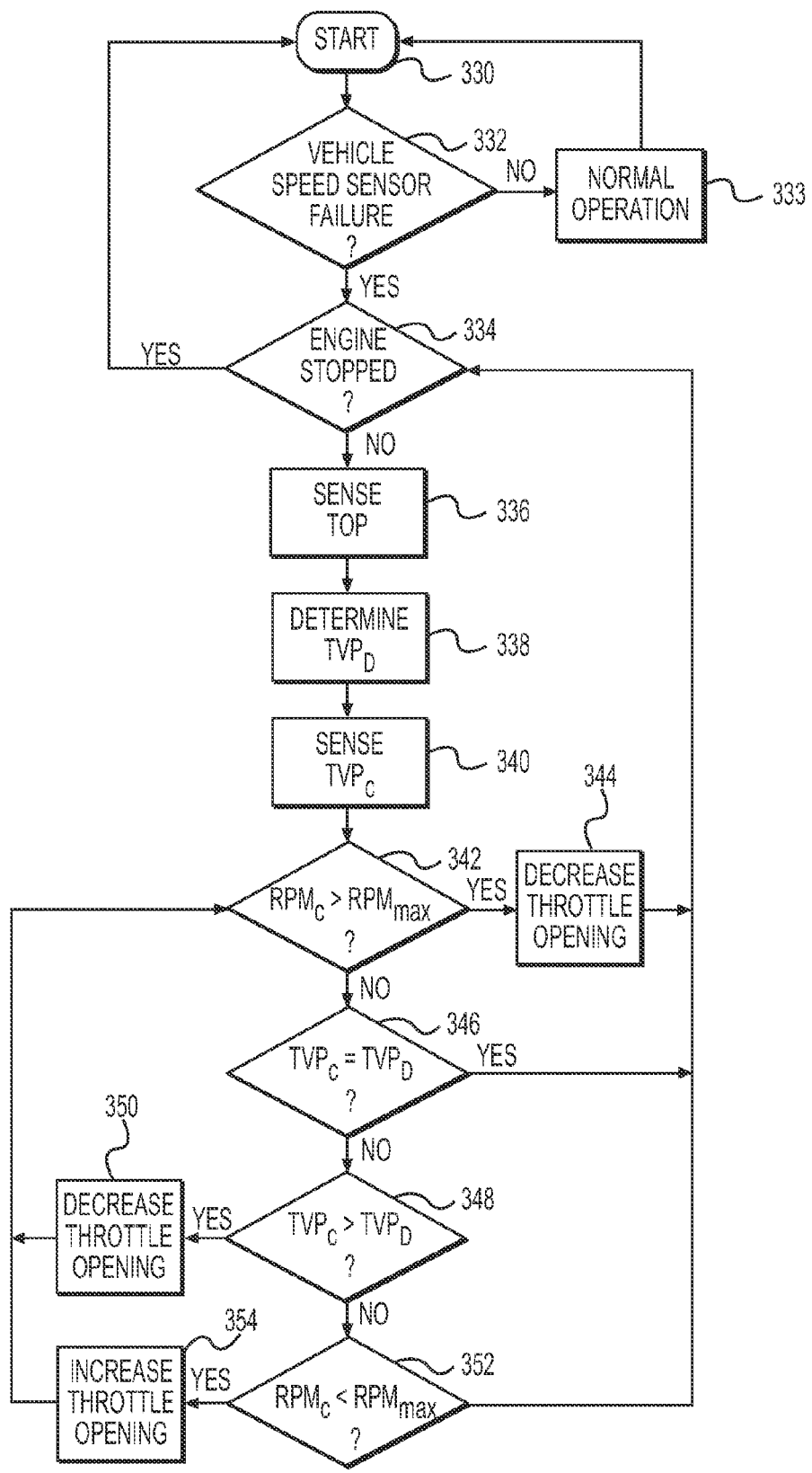
FIG. 8 is a logic diagram illustrating a method for controlling the engine when a failure of the vehicle speed sensor occurs.

FIG. 8 illustrates a method, starting at step 330, of controlling the engine 202 which limits the operation of the engine 202 to a default maximum engine speed in case of a vehicle speed sensor 208 failure. It is contemplated that the same method could be applied by using a default maximum engine torque. At step 332, the ECU 200 verifies if there is a failure of the vehicle speed sensor 208. The ECU 200 determines that there is a failure of the vehicle speed sensor 208 when it no longer receives a signal from the vehicle speed sensor 208 or the signal is inconsistent. If the vehicle speed sensor 208 operates normally, then the ECU 200 continues to operate the engine 202 of the vehicle normally (normal operation 333). Normal operation 333 of the engine 202 includes, but is not limited to, the control method illustrated in FIG. 7. If there is a failure of the vehicle speed sensor 208, the ECU 200 then verifies if the engine 202 is stopped at step 334, by removal of the key, pressing of the stop button, or otherwise. Stopping the engine 202 reinitiates the control method (step 330). Once the ECU 200 returns to step 332, and if the problem that caused the failure of the vehicle speed sensor 208 has been corrected, the ECU 200 returns to the normal operation 333 of the engine 202. Although not illustrated, it is contemplated that if a failure of the vehicle speed sensor 208 is detected at step 332, the ECU 200 will cause a signal, either audible or visual, to be emitted or cause a maintenance code to be displayed such that the driver of the vehicle is made aware of the failure.

If there is a failure of the vehicle speed sensor 208 and the engine has not been stopped, then the ECU 200 uses a control method having steps similar to those used in the method illustrated in FIG. 7, but using engine speed instead of vehicle speed. The position of the throttle operator 206 is sensed (step 336) (throttle operator position (TOP)) by using the throttle operator position sensor 204. Based on the TOP, the ECU 200 then determines the corresponding position of the throttle valve 212 (desired throttle valve position ($TVP_D$)) at step 338, either by applying an algorithm, by looking for the corresponding value in a control map, or both. At step 340, the current position of the throttle valve 212 (current throttle valve position ($TVP_C$)) is sensed by the throttle valve position sensor 210. Then, at step 342, the ECU 200 determines whether the current engine speed ($RPM_C$) is greater than the default maximum engine speed ($RPM_{MAX}$). The value of $RPM_{MAX}$ can be stored in the ECU 200 by the vehicle manufacturer, or it can be contained in the key 222 or 224 used with the vehicle as explained above, or it could be manually input by a user of the vehicle, or it could also be determined by a condition of the vehicle as described below with respect to FIG. 11. If, at step 342, the current engine speed exceeds the default maximum engine speed, the ECU 200 sends a signal to the throttle valve actuator 214 to decrease degree of opening of the throttle valve 212 (step 344). The ECU 200 then returns to step 334. If, at step 342, the current engine speed is less than the default maximum engine speed, then, at step 346, the ECU 200 verifies if the current throttle valve position is equal to the desired throttle valve position (as determined at step 338). If it is, then no action is taken and the ECU 200 returns to the step 334. If the current throttle valve position is not equal to the desired throttle valve position, then if the current throttle valve position is greater than the desired throttle valve position (step 348) the ECU 200 causes the throttle valve actuator 214 to decrease the degree of opening of the throttle valve 212 (step 350) and then the ECU 200 returns to step 334. If at step 348 the current throttle valve position is not greater than the desired throttle valve position and the current engine speed is less than the default maximum engine speed (step 352), the ECU 200 causes the throttle valve actuator 214 to increase the degree of opening of the throttle valve 212 (step 354) and then the ECU 200 returns to step 334. If, on the other hand, at step 348 the current throttle valve position is not greater than the desired throttle valve position and the current engine speed is greater than the default maximum engine speed (step 352), the ECU 200 returns to the step 334, and once it reaches step 342 it will cause the throttle valve actuator 214 to decrease degree of opening of the throttle valve 212 at step 344. Step 352 is present to ensure that the default maximum engine speed has not been exceeded since step 342 has been executed. The method illustrated in FIG. 8 is such that if the current engine speed is equal to the default maximum engine speed, the degree of opening of the throttle valve 212 is not increased notwithstanding a fact that the signal representative of the throttle operator position communicated to the ECU 200 indicates a desire by the driver to increase the speed of the vehicle. The ECU 200 will continue to control the engine 202 by applying steps 336 to 354 (as required) until the engine has been stopped (step 334) (and then restarted) and the problem that caused the failure of the vehicle speed sensor 208 has been corrected. Only then will normal operation 333 of the engine 202 resume.

Figure 9A:
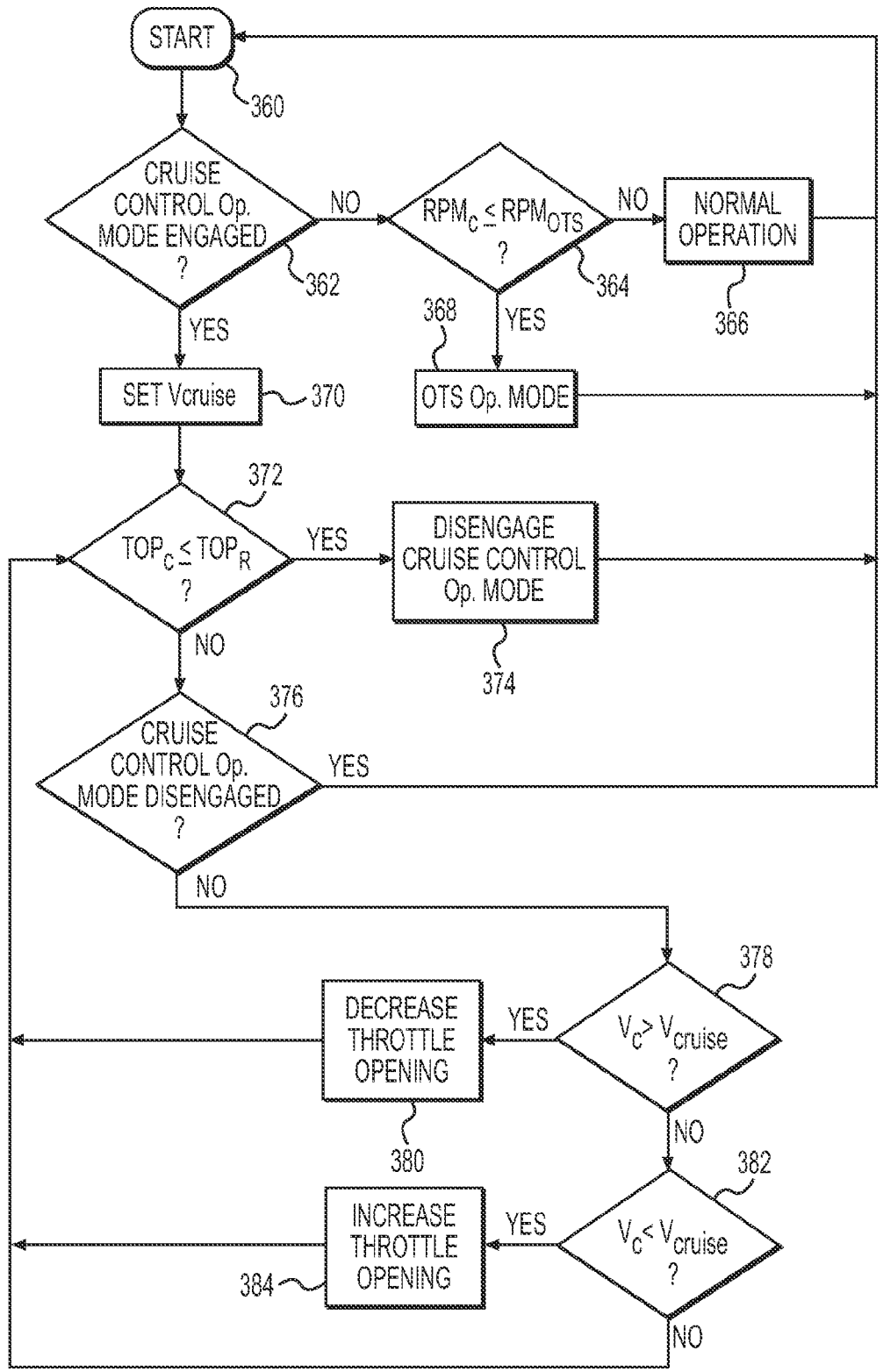
FIG. 9A is a logic diagram illustrating a method for controlling the engine in a cruise control mode.

Turning now to FIG. 9A, a method, beginning at step 360, of controlling an engine 202 in a cruise control mode will be explained. Although the method illustrated in FIG. 9A is particularly well suited for a personal watercraft, such as personal watercraft 70, as they do not typically have a brake lever that could be used to disengage the cruise control mode as in other vehicles, it is contemplated that this method could also be used in other types of vehicles. At step 362, the ECU 200 determines if the cruise control operation mode has been engaged. The cruise control operation mode would typically be engaged by using the cruise control switch 240 described above. If the cruise control mode has not been engaged, in the case of a personal watercraft, the ECU 200 then determines if the current engine speed ($RPM_C$) is less than or equal to an engine speed where an off-throttle steering operation mode should be engaged ($RPM_{OTS}$) (step 364). If it is not, the normal operation 366 of the engine 202 is applied by the ECU 200. Normal operation 366 of the engine 202 includes, but is not limited to, the control method illustrated in FIG. 7. If, on the other hand, $RPM_C$ is less than or equal to $RPM_{OTS}$, than the off-throttle steering (OTS) operation mode (step 368) is applied by the ECU 200. The OTS operation mode 368 will be described in greater detail below with respect to FIG. 10. In the case of land vehicles, steps 364 and 368 are omitted, and if the cruise control operation mode has not been engaged (step 362) then the ECU 200 continues to operate the engine 202 in the normal operation mode 366. If at step 362, the ECU 200 determines that the cruise control operation mode has been engaged, then the cruising speed ($V_{CRUISE}$) of the vehicle is set at step 370. The cruising speed can be stored in the ECU 200 by the vehicle manufacturer, or it can be contained in the key 222 or 224 used with the vehicle as explained above, or it could be manually input by a user of the vehicle, or, in a preferred embodiment, the cruising speed is set to be equal to the speed of the vehicle at the instant when the cruise control operation mode is engaged. Then at step 372, the ECU 200 determines if the current throttle operator position ($TOP_C$) is less than or equal to a reference throttle operator position ($TOP_R$). The reference throttle operator position can be stored in the ECU 200 by the vehicle manufacturer, or it can be contained in the key 222 or 224 used with the vehicle as explained above, or it can be set to be equal to the throttle operator position at the instant when the cruise control operation mode is engaged, in which case the ECU 200 would determine if the current throttle operator position is less than the reference throttle operator position. The current throttle operator position is considered to be less than the reference throttle operator position when the throttle operator is located between the reference throttle operator position and the fully released position of the throttle operator or at the fully released position of the throttle operator. Alternatively, the reference throttle operator position can be a fully released position of the throttle operator in which case the ECU 200 would determine if the current throttle operator position is equal to the reference throttle operator position. The ECU 200 then determines at step 376 if the driver of the vehicle has actively disengaged the cruise control operation mode, either by pressing the cruise control switch 240, or stopping the engine by pressing the engine stop switch or removing the key 222 or 224. If the cruise control operation mode has been disengaged by the user, then the ECU 200 returns to step 360. If the cruise control operation mode has not been disengaged by the user, then the ECU 200 causes the throttle valve actuator 214 to decrease the degree of opening of the throttle valve 212 (step 380) if the current vehicle speed is greater than the cruising speed (step 378), and to increase the degree of opening of the throttle valve 212 (step 384) if the current vehicle speed is less than the cruising speed (step 378). Once either of steps 380 or 384 has been completed or if the current vehicle speed is equal to the cruising speed, the ECU 200 returns to step 372. This is particularly advantageous as it allows the vehicle to maintain a constant cruising speed even though the load on the vehicle varies, due for example to changes in the terrain for land vehicles, or the movement of a water skier being towed by the vehicle in the case of a personal watercraft. If at step 372 the current throttle operator position is less than or equal to the reference throttle operator position, which is indicative of the driver's desire to reduce the speed of the vehicle, then the cruise control operation mode is disengaged (step 374) and the vehicle cruising speed is no longer maintained even though the driver of the vehicle has not actively disengaged the cruise control operation mode. The inclusion of step 372 allows the driver of the vehicle to move the throttle operator 206 to a more comfortable position, such as the maximum throttle operator position for thumb or finger-actuated throttle levers, while continuing to operate the vehicle at the vehicle cruising speed. For example, when the driver of a personal watercraft reaches the cruising speed he desires, he presses the cruise control switch 240. The driver can then move the throttle operator to an increased throttle operator position, the maximum position for example, which is more comfortable and easier to maintain. As long as the driver does not press the cruise control switch 240, or stop the engine, or release the throttle operator such that it moves to a position which is less than the position of the throttle operator when the cruise control switch 240 was first pressed, the cruising speed will be maintained. Should the driver press the cruise control switch 240 again, or stop the engine, or release the throttle operator such that it moves to a position which is less than the position of the throttle operator when the cruise control switch 240 was first pressed, then the cruise control mode will be disengaged and the speed of the vehicle will once again be controlled base on the throttle operator position.

Figure 9B:
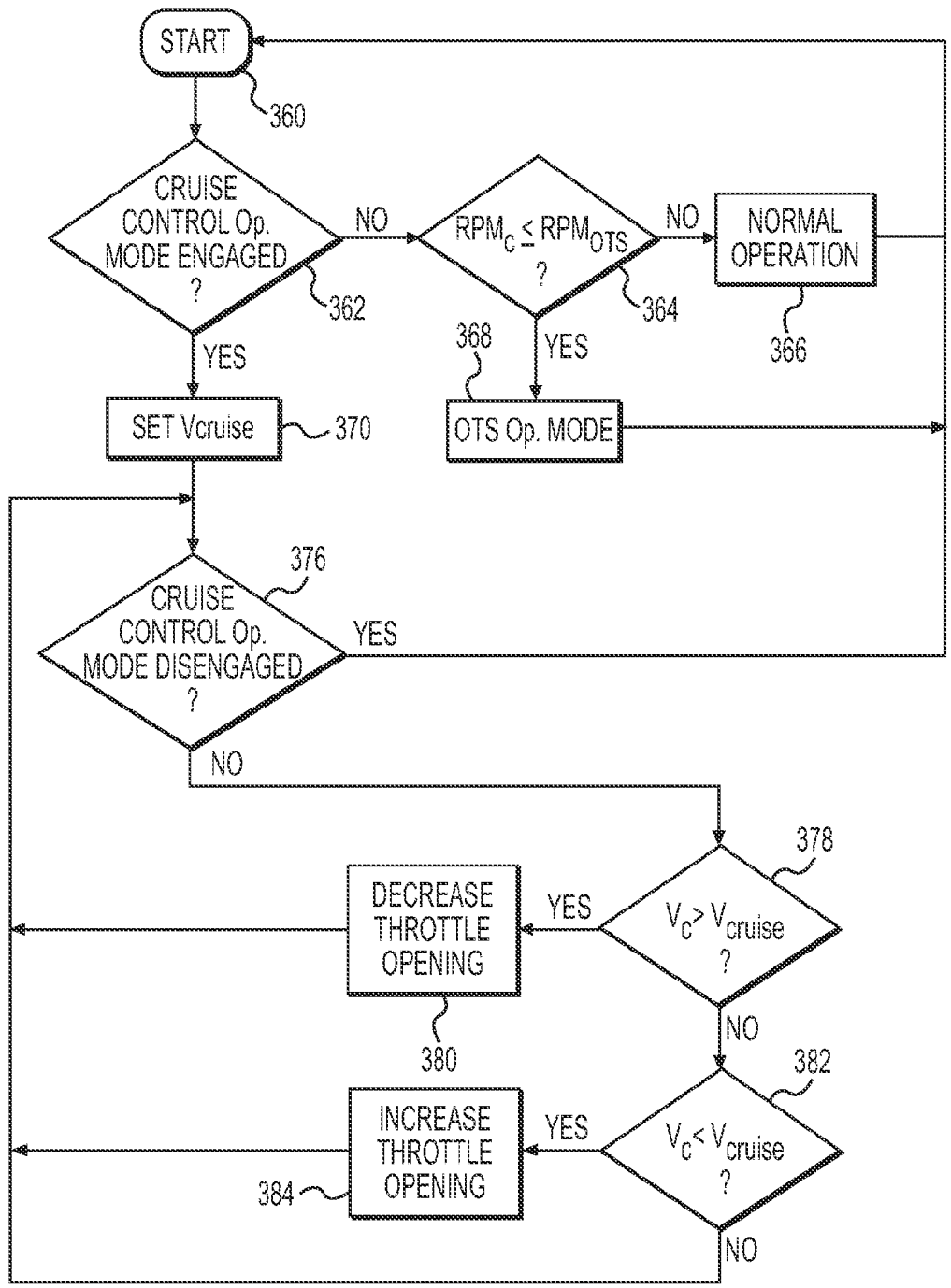
FIG. 9B is a logic diagram illustrating an alternative method for controlling the engine in a cruise control mode.

Turning now to FIG. 9B, an alternative method, beginning at step 360, of controlling an engine 202 in a cruise control mode will be explained. The method of FIG. 9B is similar to the method illustrated in FIG. 9A with the exception of steps 372 and 374 which have been eliminated. For simplicity, similar steps have been labeled with the same reference numerals as FIG. 9A and only those which are different will be described below. In the method of FIG. 9B, once the cruising speed is set at step 370, the ECU 200 then determines at step 376 if the driver of the vehicle has actively disengaged the cruise control operation mode, either by pressing the cruise control switch 240, or stopping the engine by pressing the engine stop switch or removing the key 222 or 224 as described above. However, in this embodiment, the cruise control operation mode can be actively disengaged by the driver by actuating a lever from a rest position. If at step 376 the ECU determines that the driver has actuated the lever, the cruise control operation mode is disengaged. In a preferred embodiment of the method illustrated in FIG. 9B, the lever is the throttle operator 206, in the form of a thumb or finger actuated lever. Once the driver of the vehicle has engage the cruise control operation mode, the driver can let go of the throttle operator 206 and the vehicle will operate in the cruise control operation mode until the driver actuates the throttle operator 206 again. It is contemplated that the lever could be a separate lever disposed on a side of the handlebar 244 of the vehicle opposite the side on which the throttle operator 206, for example a brake lever. If the cruise control operation mode has been disengaged by the user, then the ECU 200 returns to step 360 as described above with respect to FIG. 9A. If the cruise control operation mode has not been disengaged by the user at step 376, then the method proceeds as described above with respect to FIG. 9A, with the exception that steps 380, 384, and a negative determination at step 382 return to step 376.

Figure 10:
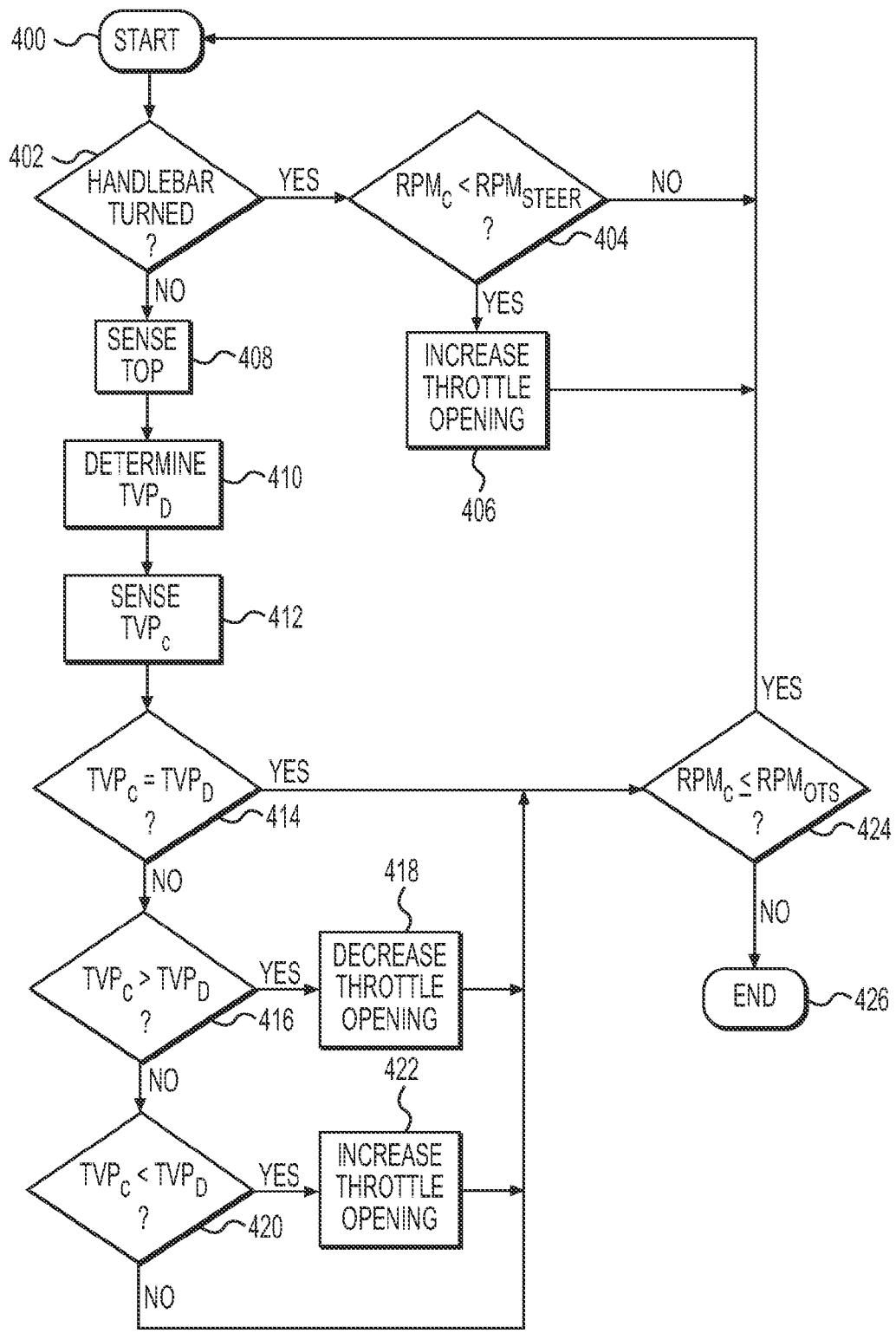
FIG. 10 is a logic diagram illustrating a method for controlling the engine in an off-throttle steering mode.

Turning now to FIG. 10, a method, starting at step 400, of controlling an engine 202 in an off-throttle steering (OTS) operation mode will be described. The method illustrated in FIG. 10 is particularly well suited for personal watercraft and other jet propelled marine vehicles as they require a certain amount of thrust in order to be steered. As mentioned with respect to the method illustrated in FIG. 9A, the ECU 200 operates the engine in the OTS operation mode when the current engine speed ($RPM_C$) is less than or equal to a predetermined engine speed ($RPM_{OTS}$). In the OTS operation mode, the ECU 200 first determines if the handlebar 244 has been turned at step 402 based on a signal received from the steering sensor 242. It is contemplated that step 402 could instead determine if the handlebar 244 has been turned by more than a predetermined angle. If the handlebar 244 has been turned, then the ECU 200 determines if the current engine speed ($RPM_C$) is less than a predetermined engine speed ($RPM_{STEER}$) which provides sufficient thrust to steer the vehicle (step 404). If it is not, then the ECU 200 returns to step 400. If the current vehicle speed is less than the predetermined engine speed ($RPM_{STEER}$), the ECU 200 causes the throttle valve actuator 214 to increase the degree of opening of the throttle valve 212 thereby increasing the speed of the engine in order to provide sufficient thrust to steer the vehicle and then returns to step 400. If at step 402, it is determined that the handlebar 244 is not turned, then the throttle operator position is sensed (step 408), the desired throttle valve position is determined by the ECU 200 (step 410), and the current throttle valve position is sensed (step 412) in the same manner as described above with respect to the methods illustrated in FIGS. 7 and 8. The ECU 200 then determines if the current throttle valve position is equal to the desired throttle valve position (step 414). If it is not, then the ECU 200 causes the throttle valve actuator 214 to decrease the degree of opening of the throttle valve 212 (step 418) if the current throttle valve position is greater than the desired throttle valve position (step 416), and to increase the degree of opening of the throttle valve 212 (step 422) if the current throttle valve position is less than the desired throttle valve position (step 420). Once either of steps 418 or 422 has been completed or if the current throttle valve position is equal to the desired throttle valve position, the ECU 200 goes to step 424. At step 424, the ECU 200 determines if the current engine speed is still less than or equal the predetermined engine speed $RPM_{OTS}$. If it is, the ECU 200 returns to step 400 and continues to control the engine 202 in the OTS operation mode. If it is not, the ECU 200 goes to step 426, ceases to control the engine 202 in the OTS operation mode, and returns to the previous operation mode such as the ones illustrated in FIGS. 9A and 9B. As previously mentioned, U.S. Pat. No. 6,405,669, entitled "Watercraft with Steer-Response Engine Speed Controller", issued on Jun. 18, 2002, the entirety of which is incorporated herein, also describes a system for controlling an engine in an OTS operation mode.

Steps 310, 316, 320, 344, 350, 354, 380, 384, 406, 418, and 422 described above can be achieved by causing the throttle valve actuator 214 to decrease or increase, as the case may be, the degree of opening of the throttle valve 212 in a single step that would bring the current vehicle speed (for steps 310, 380, and 384), the current engine speed (for steps 344 and 406), or the current position of the throttle valve 212 (for steps 316, 320, 350, 354, 380, 384, 418, and 422) to the desired value. However, in a preferred embodiment, these steps only decrease or increase, as the case may be, the degree of opening of the throttle valve 212 in multiple stages and the ECU 200 runs through the corresponding method between each stage to determine whether to apply the same step again or if a change has occurred which requires a different step to be applied. For example, in view of the method illustrated in FIG. 7, a land vehicle which starts to go downhill may require step 310 to be applied even though step 320 was being applied previously. This provides for a smoother operation of the engine 202 and for a quicker response to changes in the operation of the vehicle.

As previously mentioned with respect to some of the previously described control methods, a condition of the vehicle can also be used to determine the operational limit of the vehicle or engine 202. One such condition is the vehicle operation direction (forward or reverse). It is desirable that the performance of the vehicle or engine 202 be more limited when the vehicle is operated in the reverse direction than when it is operated in the forward direction.

Figure 11:
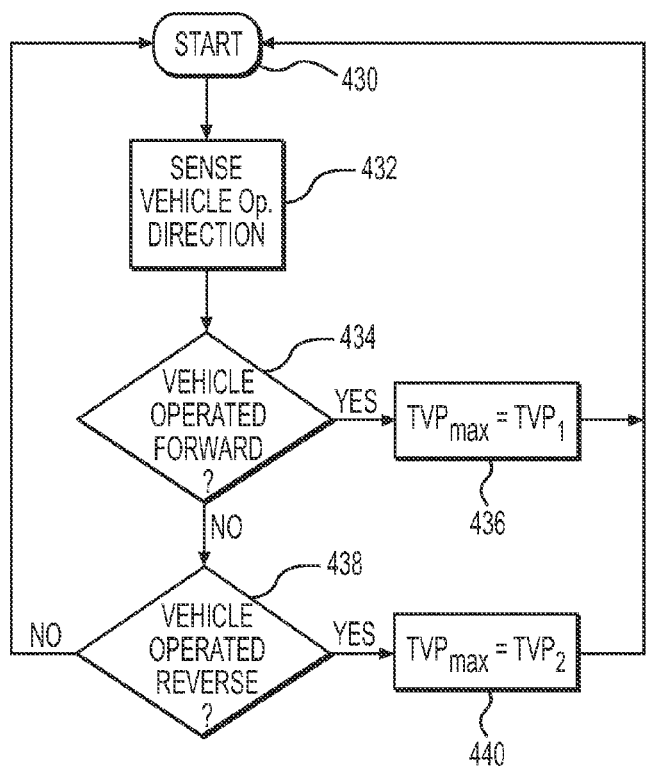
FIG. 11 is a logic diagram illustrating a method for controlling a maximum degree of opening of the throttle valve when a vehicle operates in a reverse direction.

FIG. 11 illustrates a method, starting at step 430, of establishing the speed limit of the engine 202 by limiting the degree of opening of the throttle valve 212 based on the direction of operation of the vehicle. During operation of the vehicle, the ECU 200 will not cause the throttle valve actuator 214 to move the throttle valve 212 beyond the maximum degree of opening of the throttle valve 212 ($TVP_{MAX}$) as determined by the method, notwithstanding a fact that the signal representative of the throttle operator position communicated to the ECU 200 indicates a desire by the driver to increase the degree of opening of the throttle valve 212. When the degree of opening of the throttle valve 212 is less than the maximum degree of opening of the throttle valve 212, the ECU 200 controls the opening of the throttle valve 212 based on the signal received from the throttle operator position sensor 204. The vehicle operation direction sensor, described above, sends a signal indicative of the vehicle operation direction to the ECU 200 at step 432. If the vehicle is operated in the forward direction (step 434), then the maximum degree of opening of the throttle valve is limited to a first maximum degree of opening of the throttle valve ($TVP_1$) (step 436). If the vehicle is operated in the reverse direction (step 438), then the maximum degree of opening of the throttle valve is limited to a second maximum degree of opening of the throttle valve ($TVP_2$) (step 440) which is less than the first maximum degree of opening of the throttle valve. Therefore, the engine 202 can reach a higher speed when the vehicle is operated in the forward direction than in the reverse direction.

Figure 12:
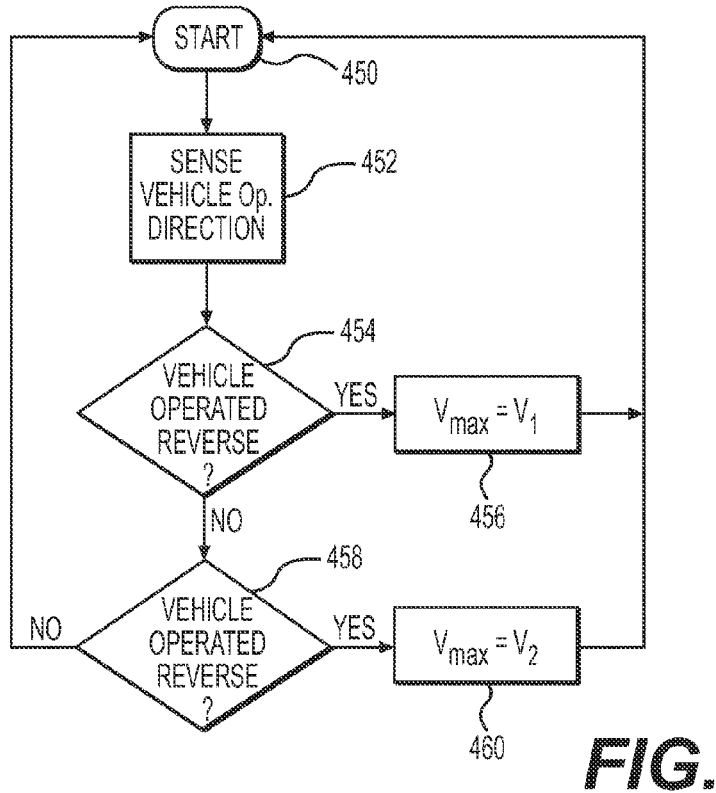
FIG. 12 is a logic diagram illustrating a method for controlling a maximum vehicle speed when a vehicle operates in a reverse direction.

FIG. 12 illustrates a method, starting at step 450, of establishing the speed limit of the vehicle based on the direction of operation of the vehicle. During operation of the vehicle, the ECU 200 will control the engine 202 such that the vehicle does not exceed the maximum vehicle speed ($V_{MAX}$) as determined by the method, notwithstanding a fact that the signal representative of the throttle operator position communicated to the ECU 200 indicates a desire by the driver to increase the vehicle speed. When the vehicle speed is less than the maximum vehicle speed, the ECU 200 controls the opening of the throttle valve 212 based on the signal received from the throttle operator position sensor 204. The vehicle operation direction sensor, described above, sends a signal indicative of the vehicle operation direction to the ECU 200 at step 452. If the vehicle is operated in the forward direction (step 454), then the maximum vehicle speed is limited to a maximum forward vehicle speed ($V_1$) (step 456). If the vehicle is operated in the reverse direction (step 458), then the maximum vehicle speed is limited to a maximum reverse vehicle speed ($V_2$) (step 460) which is less than the maximum forward vehicle speed. Therefore, the vehicle can reach a higher speed when the vehicle is operated in the forward direction than in the reverse direction.

Figure 13:
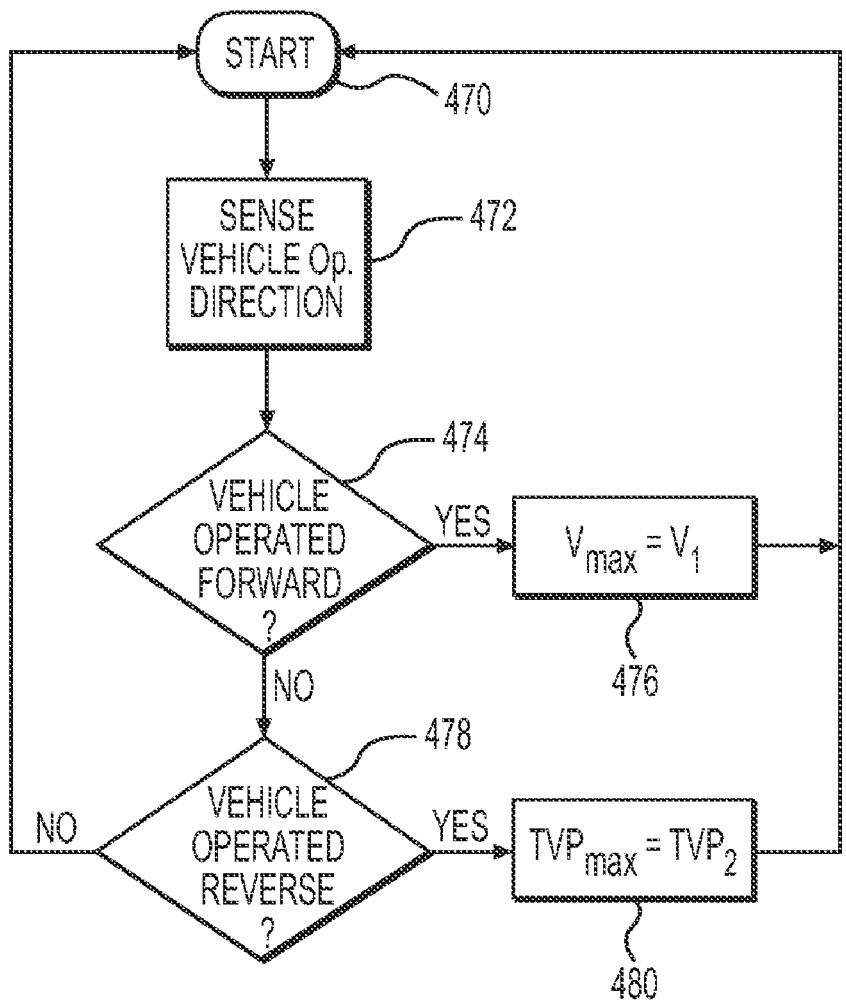
FIG. 13 is a logic diagram illustrating a method of controlling a maximum vehicle performance based on the vehicle operation direction.

FIG. 13 illustrates a method, starting at step 470, of establishing the operational limit of the vehicle by limiting the operational limit of the vehicle based on the direction of operation of the vehicle. When the vehicle operates in a forward direction, the ECU 200 limits the maximum speed of the vehicle, and when the vehicle operates in a reverse direction, the ECU 200 limits the maximum degree of opening of the throttle valve, as described in detail below. It is also contemplated that the ECU 200 could limit the maximum degree of opening of the throttle valve when the vehicle operates in a forward direction and limit the maximum speed of the vehicle when the vehicle operates in a reverse direction.

The vehicle operation direction sensor, described above, sends a signal indicative of the vehicle operation direction to the ECU 200 at step 472. If the vehicle is operated in the forward direction (step 474), then the maximum vehicle speed ($V_{MAX}$) is limited to a maximum forward vehicle speed ($V_1$) (step 476). During forward operation of the vehicle, the ECU 200 will control the engine 202 such that the vehicle does not exceed the maximum vehicle speed ($V_{MAX}$) as determined by the method, notwithstanding a fact that the signal representative of the throttle operator position communicated to the ECU 200 indicates a desire by the driver to increase the vehicle speed. When the vehicle speed is less than the maximum vehicle speed, the ECU 200 controls the opening of the throttle valve 212 based on the signal received from the throttle operator position sensor 204. If the vehicle is operated in the reverse direction (step 478), then the maximum degree of opening of the throttle valve ($TVP_{MAX}$) is limited to a maximum degree of opening of the throttle valve ($TVP_2$) (step 480). $TVP_2$ is selected such that when the engine operates at that degree of opening of the throttle valve 212, the speed of the vehicle is less than the maximum forward vehicle speed. During reverse operation of the vehicle, the ECU 200 will not cause the throttle valve actuator 214 to move the throttle valve 212 beyond the maximum degree of opening of the throttle valve 212 ($TVP_{MAX}$) as determined by the method, notwithstanding a fact that the signal representative of the throttle operator position communicated to the ECU 200 indicates a desire by the driver to increase the degree of opening of the throttle valve 212. When the degree of opening of the throttle valve 212 is less than the maximum degree of opening of the throttle valve 212, the ECU 200 controls the opening of the throttle valve 212 based on the signal received from the throttle operator position sensor 204. Therefore, the engine 202 can reach a higher speed when the vehicle is operated in the forward direction than in the reverse direction.

For the methods illustrated in FIGS. 11 to 13, it is contemplated that the ECU 200 would control the engine 202 such that the rate of change in engine speed and/or engine torque and/or throttle valve position is different depending on the direction of operation of the vehicle. It is also contemplated that an override switch could be added to the vehicle which, when pressed, would make the ECU 200 control the engine 202 such that the throttle valve position can exceed the maximum degree of opening of the throttle valve (step 440 in FIG. 11, step 480 in FIG. 13) or such that the speed of the vehicle can exceed the maximum reverse vehicle speed (step 460 in FIG. 12), as the case may be, when the vehicle is operated in the reverse direction.

Figure 14:
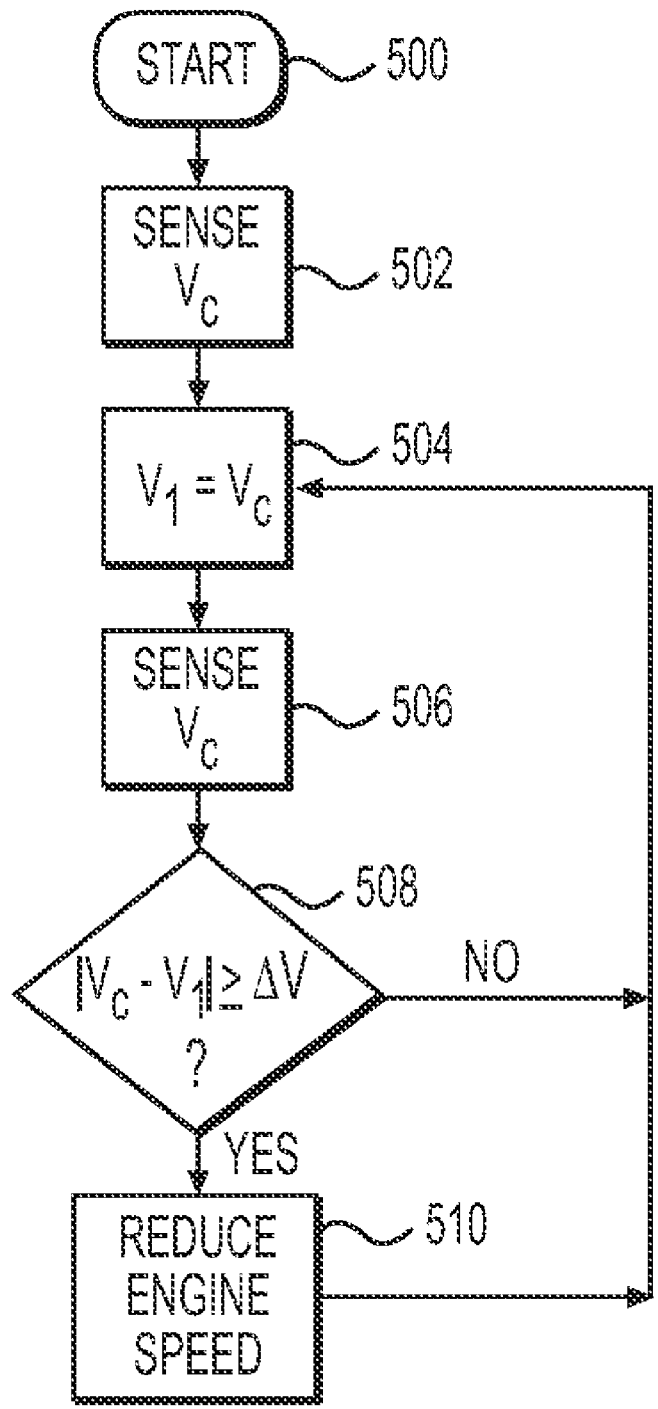
FIG. 14 is a logic diagram illustrating a control scheme adopted by the ECU when a sudden increase in vehicle speed occurs.

Turning now to FIG. 14 a method of controlling the engine 202 of a vehicle when a sudden acceleration occurs will be described. For simplicity, the method will be described with respect to the ATV 150, but it should be understood that it could apply to any land vehicle, such as snowmobile 10. During operation, the powered wheels 158 of the ATV 150 can sometimes lose contact with the surface on which the ATV 150 is operated due to bumps. When this occurs, the rotation of the wheels 158 is no longer restrained since they are in the air and this will cause them to start to accelerate suddenly if the throttle operator 206 is not released by the driver of the ATV 150. When the wheels 158 make contact with the ground once again, the wheels 158 are suddenly decelerated which may result in components of the ATV 150 being damaged. If the ATV is equipped with a vehicle speed sensor 208 which senses the speed of rotation of a wheel 158 or of one of the shafts transmitting power to the wheel 158, as described above, then it is possible to determine that such a condition has occurred, and it is possible to take appropriate actions as described below.

As shown in FIG. 14, the ECU 200 can be programmed to reduce the speed of rotation of the engine 202 when large increases the readings taken by the vehicle speed sensor 208. After initiating the program (step 500), the first step 502 consists in sensing the current speed of the vehicle ($V_C$) by using the vehicle speed sensor 208. The ECU 200 then stores the value of $V_C$ in its memory as the value of $V_1$ at step 504. The current speed of the vehicle ($V_C$) is then sensed once again by using the vehicle speed sensor 208 at step 506. At step 508, the ECU 200 then compares the value of $V_C$ sensed at step 506 to the value of $V_1$ (which corresponds to the previously sensed value of $V_C$). If the difference between $V_C$ and $V_1$ is less than a predetermined maximum acceptable variation in vehicle speed ($\Delta V$), the ECU 200 returns to step 504 where the value of $V_C$ sensed at step 506 is stored as the value of $V_1$ and the program is repeated. If, at step 508, the difference between $V_C$ and $V_1$ is greater than or equal to $\Delta V$, which is indicative of a sudden increase in the speed of rotation of the wheels 158 of the ATV 150 most likely caused by the wheels 158 no longer being in contact with the ground, then the ECU 200 moves to step 510. At step 510 the ECU 200 will reduce the speed of rotation of the engine 202 in order to reduce to speed of rotation of the wheel 158 such that the degree of deceleration of the wheels 158 when they make contact once again with the ground is minimized. In order to reduce the speed of rotation of the engine 202, the ECU 200 sends a signal to the throttle valve actuator 214 to reduce the degree of opening of the throttle valve 212. It is contemplated that the speed of rotation of the engine 202 could also be reduced by adjusting the ignition and injection timing and the amount of fuel being injected. The program then returns to step 504 and is repeated. $\Delta V$ is preferably selected to be larger than what would be normally possible for the ATV 150 under normal circumstance (i.e. with the wheels 158 in contact with the ground). For example, $\Delta V$ could be selected to be greater than the change of vehicle speed that would occur under the maximum possible acceleration of the ATV 150.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A vehicle comprising:
   a vehicle body;
   a straddle seat for a driver, the seat being associated with the vehicle body;
   a handlebar for steering the vehicle disposed forwardly of the straddle seat;
   an engine associated with the vehicle body for powering the vehicle, the engine having at least one combustion chamber;
   an electronic control unit (ECU) on the vehicle for controlling an operation of the engine;
   a throttle body in fluid communication with the at least one combustion chamber;
   a throttle valve disposed in the throttle body for controlling an amount of air supplied to the at least one combustion chamber;
   a throttle valve actuator operatively connected to the throttle valve and in electronic communication with the ECU;
   a throttle operator mounted on the handlebar;
   a throttle operator position sensor for sensing a throttle operator position and in electronic communication with the ECU for sending a signal representative of a throttle operator position to the ECU; and
   a vehicle speed sensor for sensing a vehicle speed and in electronic communication with the ECU for sending a signal representative of a vehicle speed to the ECU,
   the ECU sending a control signal to the throttle valve actuator based on the throttle operator position signal and the vehicle speed signal,
   the throttle valve actuator adjusting a degree of opening of the throttle valve in response to the control signal,
      if the vehicle speed is lower than a predetermined maximum vehicle speed, the control signal causing the throttle valve actuator to adjust the degree of opening of the throttle valve based on the throttle operator position signal, and
      if the vehicle speed is higher than the predetermined maximum vehicle speed, the control signal causing the throttle valve actuator to reduce the degree of opening of the throttle valve.

2. The vehicle of claim 1, wherein if the vehicle speed is higher than the predetermined maximum vehicle speed, the control signal causes the throttle valve actuator to reduce the degree of opening of the throttle valve notwithstanding a fact that the signal representative of the throttle operator position communicated to the ECU indicates a desire by the driver to increase the speed of the vehicle.

3. The vehicle of claim 1, wherein, if the vehicle speed is equal to the predetermined maximum vehicle speed, the degree of opening of the throttle valve is not increased notwithstanding a fact that the signal representative of the throttle operator position communicated to the ECU indicates a desire by the driver to increase the speed of the vehicle.

4. The vehicle of claim 3, wherein the throttle operator is selected from a group consisting of a thumb-actuated throttle lever, a finger-actuated throttle lever, and a twist grip.

5. The vehicle of claim 4, further comprising a jet propulsion unit operatively connected to the engine;
   wherein the vehicle body has a hull and a deck disposed on the hull; and
   wherein the engine is disposed between the hull and the deck.

6. The vehicle of claim 5, wherein the vehicle speed sensor is selected from a group consisting of a paddle wheel, a GPS unit, and a pitot tube.

7. The vehicle of claim 4, further comprising only three wheels associated with the vehicle body.

8. The vehicle of claim 4, further comprising at least one of at least four wheels associated with the vehicle body and an endless track associated with the vehicle body.

9. The vehicle of claim 1, wherein the vehicle speed sensor includes a GPS unit.

10. The vehicle of claim 1, wherein the vehicle speed sensor senses a rotational speed of a shaft of the vehicle.

11. The vehicle of claim 1, further comprising:
    a fuel injection system for injecting fluid in the at least one combustion chamber;
    an ignition system for igniting a mixture of fuel and air in the at least one combustion chamber; and
    a throttle valve position sensor for sensing the degree of opening of the throttle valve and in electronic communication with the ECU for sending a signal representative of a throttle valve position to the ECU, the ECU controlling at least one of the fuel injection system and the ignition system based on the throttle valve position signal.

12. The vehicle of claim 1, further comprising a throttle valve position sensor for sensing the degree of opening of the throttle valve and in electronic communication with the ECU for sending a signal representative of a throttle valve position to the ECU;

wherein the ECU establishes a desired degree of opening of the throttle valve based on the throttle operator position signal; and wherein the ECU generates the control signal both by:
(a) comparing the desired degree of opening of the throttle valve to the degree of opening of the throttle valve, and
(b) comparing the vehicle speed to the predetermined maximum vehicle speed.

13. The vehicle of claim 1, wherein, when a variation in the vehicle speed signal occurs which is greater than a predetermined maximum acceptable variation, the ECU ignores the variation in the vehicle speed signal for a predetermined time delay.

14. The vehicle of claim 1, wherein, when a failure of the vehicle speed sensor is detected, the ECU limits the operation of the engine to one of a default maximum engine speed and a default maximum engine torque; and wherein the one of the default maximum engine speed and the default maximum engine torque is selected such that when the engine operates at the one of the default maximum engine speed and the default maximum engine torque, the vehicle speed is less than the predetermined maximum vehicle speed.

15. The vehicle of claim 1, further comprising a key receiver disposed on the vehicle body for receiving one of at least two keys that can be used to permit operation of the vehicle, the key receiver being in electronic communication with the ECU;

wherein the predetermined maximum vehicle speed is determined from information contained on the one of the at least two keys which is received in the key receiver; and wherein the predetermined maximum vehicle speed is different for each of the at least two keys.

16. The vehicle of claim 1, wherein the predetermined maximum vehicle speed is permanently stored in the ECU.

17. The vehicle of claim 1, wherein, when a variation in the vehicle speed signal occurs which is greater than a predetermined maximum acceptable variation, the ECU controls the engine such that a speed of rotation of the engine is reduced.

18. A method of controlling an engine of a vehicle, the engine having at least one combustion chamber, the vehicle having a throttle operator, a throttle body in fluid communication with the at least one combustion chamber, a throttle valve disposed in the throttle body for controlling an amount of air supplied to the at least one combustion chamber, and a throttle valve actuator operatively connected to the throttle valve for adjusting a degree of opening of the throttle valve, the method comprising:

sensing a throttle operator position;
sensing a vehicle speed;
comparing the vehicle speed to a predetermined maximum vehicle speed;

if the vehicle speed is lower than the predetermined maximum vehicle speed, adjusting the degree of opening of the throttle valve based on the throttle operator position; and if the vehicle speed is higher than the predetermined maximum vehicle speed, reducing the degree of opening of the throttle valve until the vehicle speed is at the predetermined maximum speed.

19. The method of claim 18, further comprising:
if vehicle speed is greater than the predetermined maximum vehicle speed, not implementing a driver instruction to increase the degree of opening of the throttle valve.

20. The method of claim 18, further comprising:
if vehicle speed is equal to the predetermined maximum vehicle speed, not implementing a driver instruction to increase the degree of opening of the throttle valve.

21. The method of claim 18, wherein the step of sensing the vehicle speed includes sensing one of a rotational speed of a paddle wheel mounted to the vehicle, a rotational speed of a shaft of the vehicle, and a pressure of a fluid in which the vehicle is used.

22. The method of claim 18, wherein the step of sensing the vehicle speed includes determining a change in position of the vehicle over a period of time based on information obtained from a GPS unit.

23. The method of claim 18, further comprising:
sensing the degree of opening of the throttle valve; and
controlling at least one of a fuel injection system and an ignition system based on the degree of opening of the throttle valve.

24. The method of claim 18, further comprising sensing the degree of opening of the throttle valve; and wherein the step of adjusting the degree of opening of the throttle valve includes:
establishing a desired degree of opening of the throttle valve based on the throttle operator position;
if the desired degree of opening of the throttle valve is less than the degree of opening of the throttle valve, decreasing the degree of opening of the throttle valve until the degree of opening of the throttle valve is equal to the desired degree of opening of the throttle valve; and
if the desired degree of opening of the throttle valve is greater than the degree of opening of the throttle valve, increasing the degree opening of the throttle valve until one of a first condition and a second condition is met, the first condition being that the degree of opening of the throttle valve is equal to the desired degree of opening of the throttle valve, and the second condition being that the vehicle speed is equal to the predetermined maximum vehicle speed.

25. The method of claim 18, further comprising:
ignoring a variation in the vehicle speed which is greater than a predetermined maximum acceptable variation for a predetermined time delay when sensing the vehicle speed; and
using the vehicle speed prior to the variation in the vehicle speed when comparing the vehicle speed to the predetermined maximum vehicle speed during the predetermined time delay.

26. The method of claim 18, further comprising:
sensing for failure of a vehicle speed sensor; and
limiting the engine to one of a default maximum engine speed and a default maximum engine torque when failure of the vehicle speed sensor is sensed, wherein the one of the default maximum engine speed and the default maximum engine torque is selected such that when the engine is at the one of the default maximum engine speed and the default maximum engine torque, the vehicle speed is lower than the predetermined maximum vehicle speed.

27. The method of claim 18, further comprising:
obtaining information contained on a key inserted in a key receiver of the vehicle; and
using the information contained on the key to determine the predetermined maximum vehicle speed.

28. The method of claim 18, further comprising:
reducing a speed of rotation of the engine when a variation in the vehicle speed is greater than a predetermined maximum acceptable variation.

* * * * *